US009345949B2

(12) United States Patent
Gerard et al.

(10) Patent No.: US 9,345,949 B2
(45) Date of Patent: May 24, 2016

(54) TRADING CARD GAME AND METHOD OF PLAY

(71) Applicant: Ted Andre Lucquito Gerard, Avenel, NJ (US)

(72) Inventors: Ted Andre Lucquito Gerard, Avenel, NJ (US); Julio Colon, Bronx, NY (US)

(73) Assignee: Ted Gerard, Woodbridge, NJ (US)

( * ) Notice: Subject to any disclaimer, the term of this patent is extended or adjusted under 35 U.S.C. 154(b) by 0 days.

(21) Appl. No.: 14/211,361

(22) Filed: Mar. 14, 2014

(65) Prior Publication Data

US 2014/0327210 A1    Nov. 6, 2014

Related U.S. Application Data

(60) Provisional application No. 61/787,089, filed on Mar. 15, 2013.

(51) Int. Cl.
*A63F 1/00*     (2006.01)
*A63F 13/30*    (2014.01)

(52) U.S. Cl.
CPC . *A63F 1/00* (2013.01); *A63F 13/12* (2013.01); *A63F 2001/008* (2013.01); *A63F 2300/807* (2013.01)

(58) Field of Classification Search
CPC   A63F 1/00;  A63F 2300/807;  A63F 2001/008
USPC ......... 273/292, 303, 304, 305, 306, 308, 262, 273/255
See application file for complete search history.

(56) References Cited

U.S. PATENT DOCUMENTS

| 5,662,332 | A  | * | 9/1997  | Garfield ........................ 273/308 |
| 6,254,099 | B1 | * | 7/2001  | Pederson ...................... 273/292 |
| 6,601,851 | B1 |   | 8/2003  | Sakamoto et al. |
| 7,216,870 | B1 |   | 5/2007  | Bess et al. |
| 2002/0147039 | A1 |   | 10/2002 | Mahar et al. |
| 2006/0017229 | A1 | * | 1/2006 | Hayakawa et al. ........... 273/292 |
| 2007/0235940 | A1 |   | 10/2007 | Stuart et al. |
| 2008/0088088 | A1 | * | 4/2008 | Gress ........................... 273/293 |
| 2009/0295092 | A1 |   | 12/2009 | Kuneman |

OTHER PUBLICATIONS

BoardGameGeek, "Warhammer: Invasion (2009)." BoardGameGeek.com (2009), p. 1-3 [online] URL=<http://www.boardgamegeek.com/boardgame/47185/warhammer-invasion>.

(Continued)

*Primary Examiner* — Benjamin Layno
(74) *Attorney, Agent, or Firm* — Stroock & Stroock & Lavan, LLP.

(57) ABSTRACT

Disclosed herein is a novel game that utilizes virtual or physical trading cards as game components. In one aspect of the game, game components/cards are used to build an army of minion, leader, and army cards, and further forming a perimeter comprising at least one of a barrier or fort card to protect a throne card. The goal is to destroy at least one of the barrier or fort cards by reducing the points of each to zero, thus capturing the opponent's throne card. The game involves strategy and chance, during which players create a deck for use against the deck(s) of one or more opposing players. The game may be played on various media, including, but not limited to, electronic game consoles, computers, and interactive and social media networks accessed using computers, cellular devices, tablets, etc.

18 Claims, 42 Drawing Sheets

(56) References Cited

OTHER PUBLICATIONS

Magic Wiki, "Magic the Gathering: Rules." mtg.wikia.com, Web archive (Aug. 20, 2012)), p. 3, 5-10 [online] URL= https://web.archive.org/web/20120820130628/http://mtg.wikia.com/wiki/Rules>.

International Search Report issued on Dec. 16, 2014 in International Application No. PCT/US2014/027578.

* cited by examiner

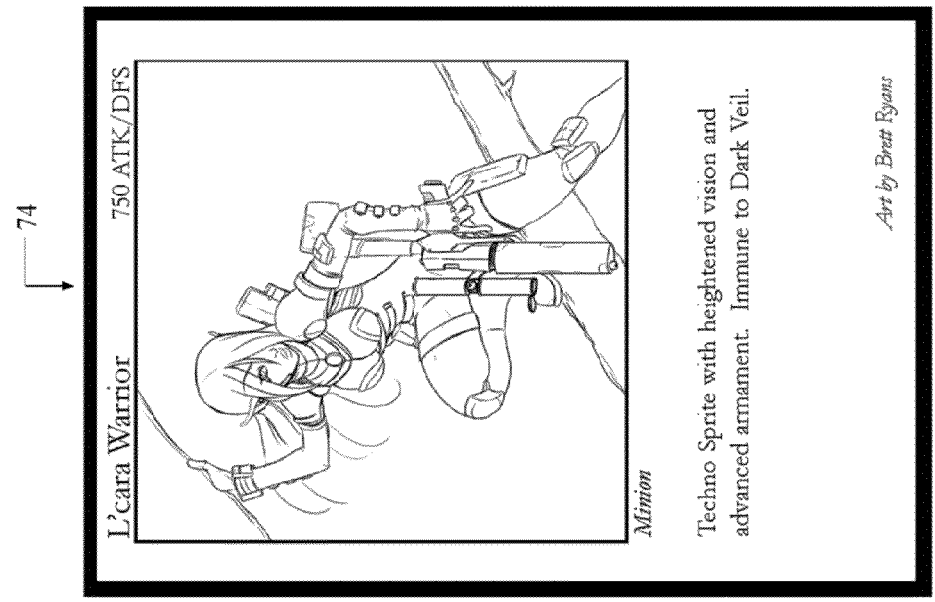
Fig. 1-B
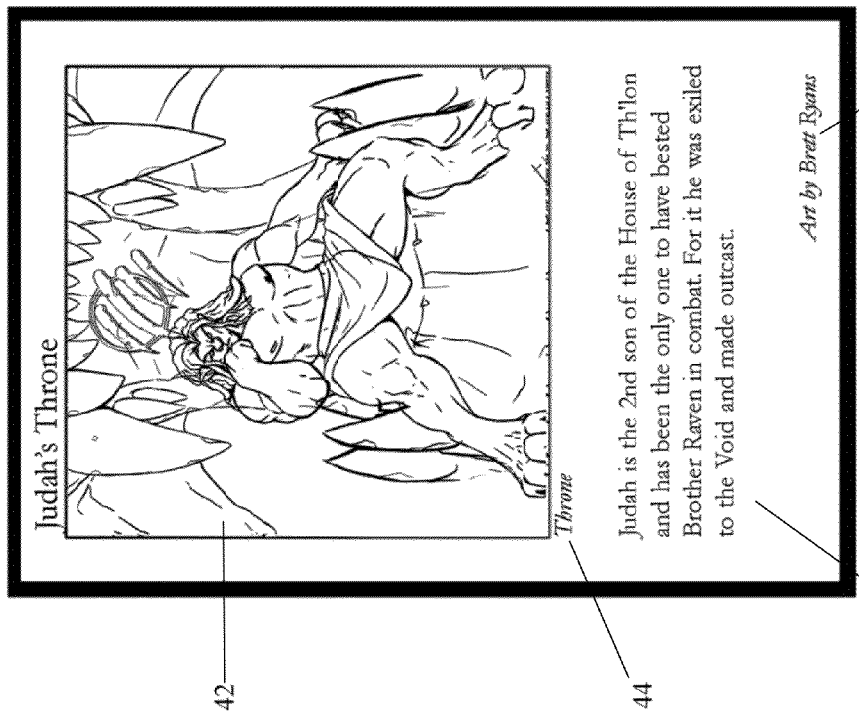
Fig. 1-A

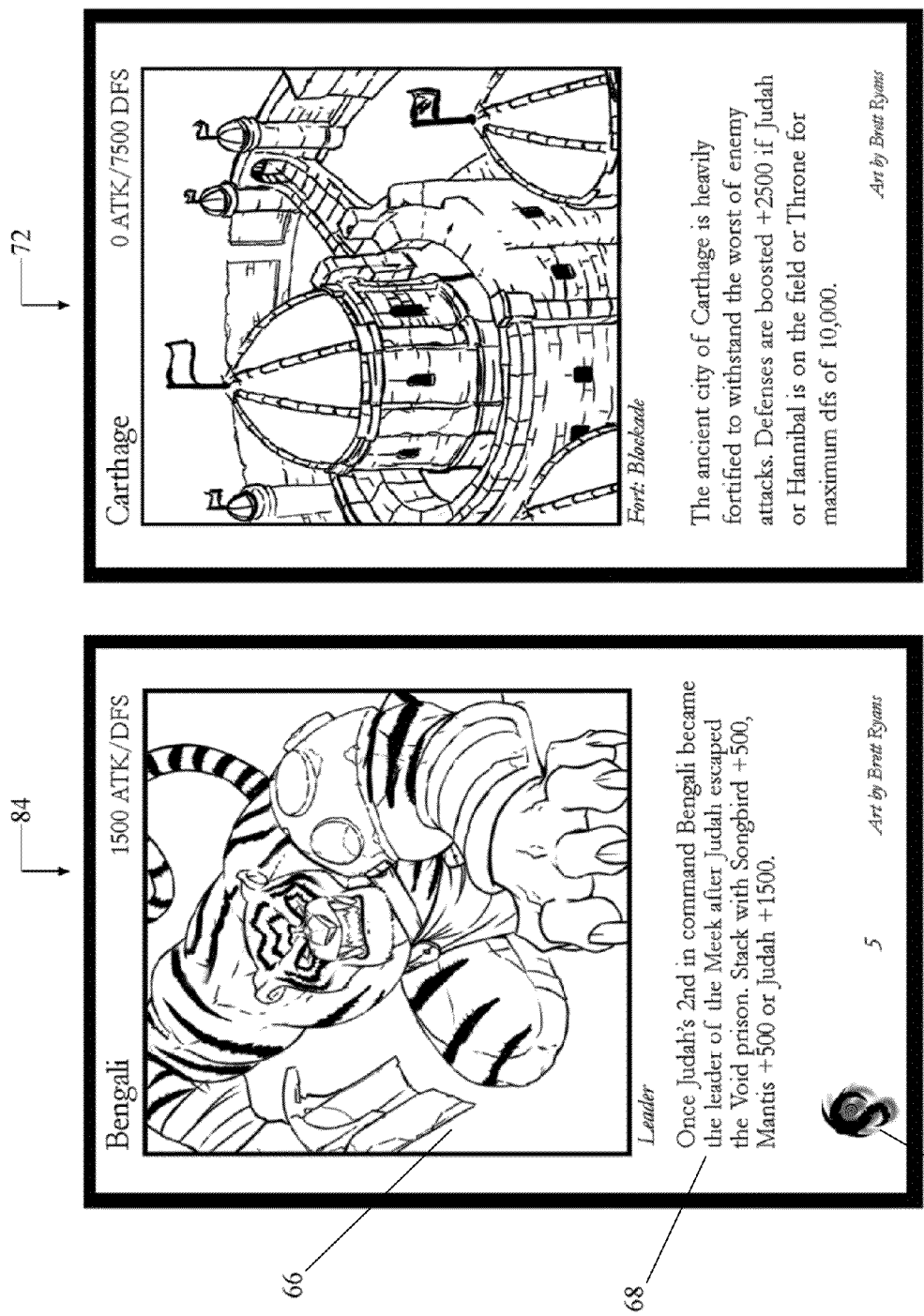
Fig. 1-D
Fig. 1-C

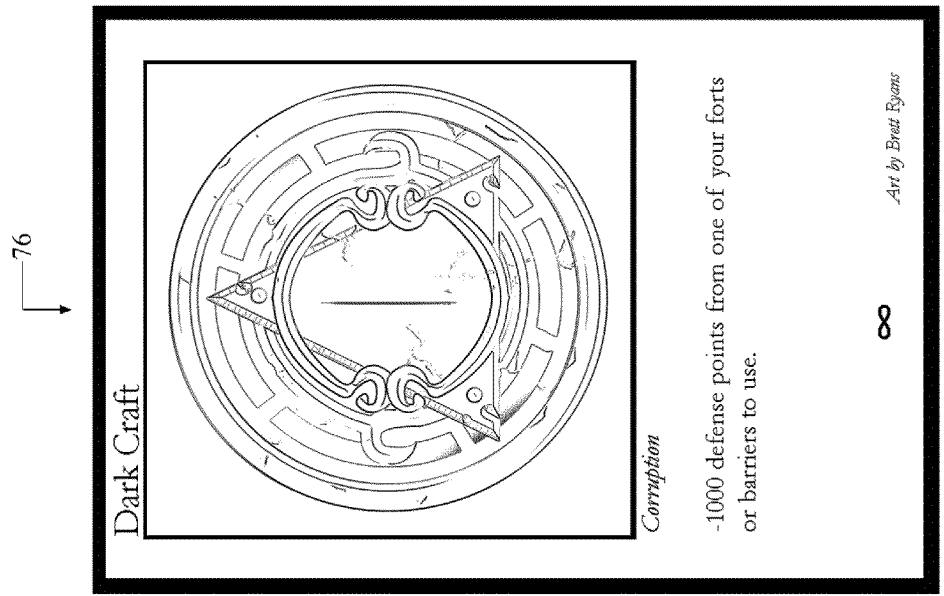
Fig. 2-B
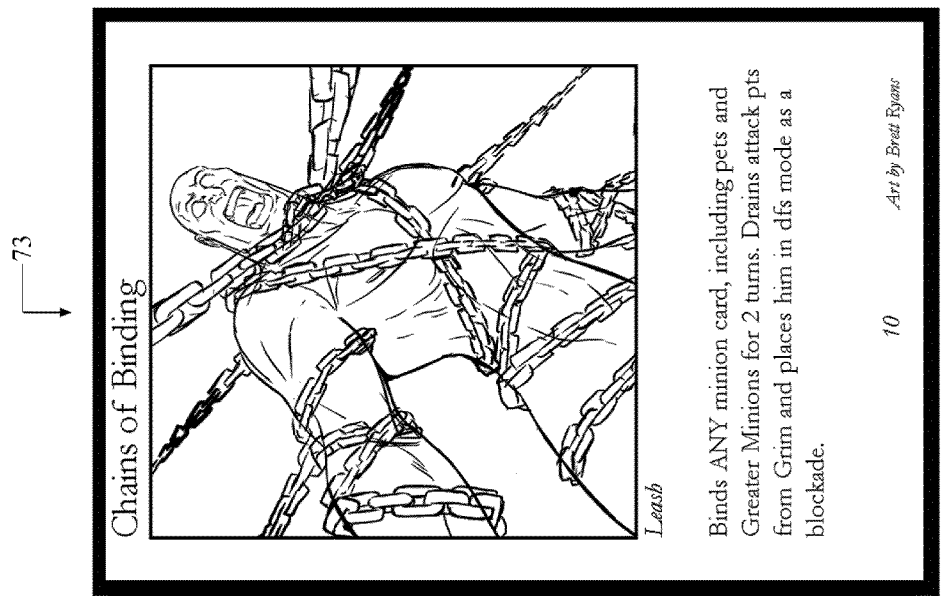
Fig. 2-A

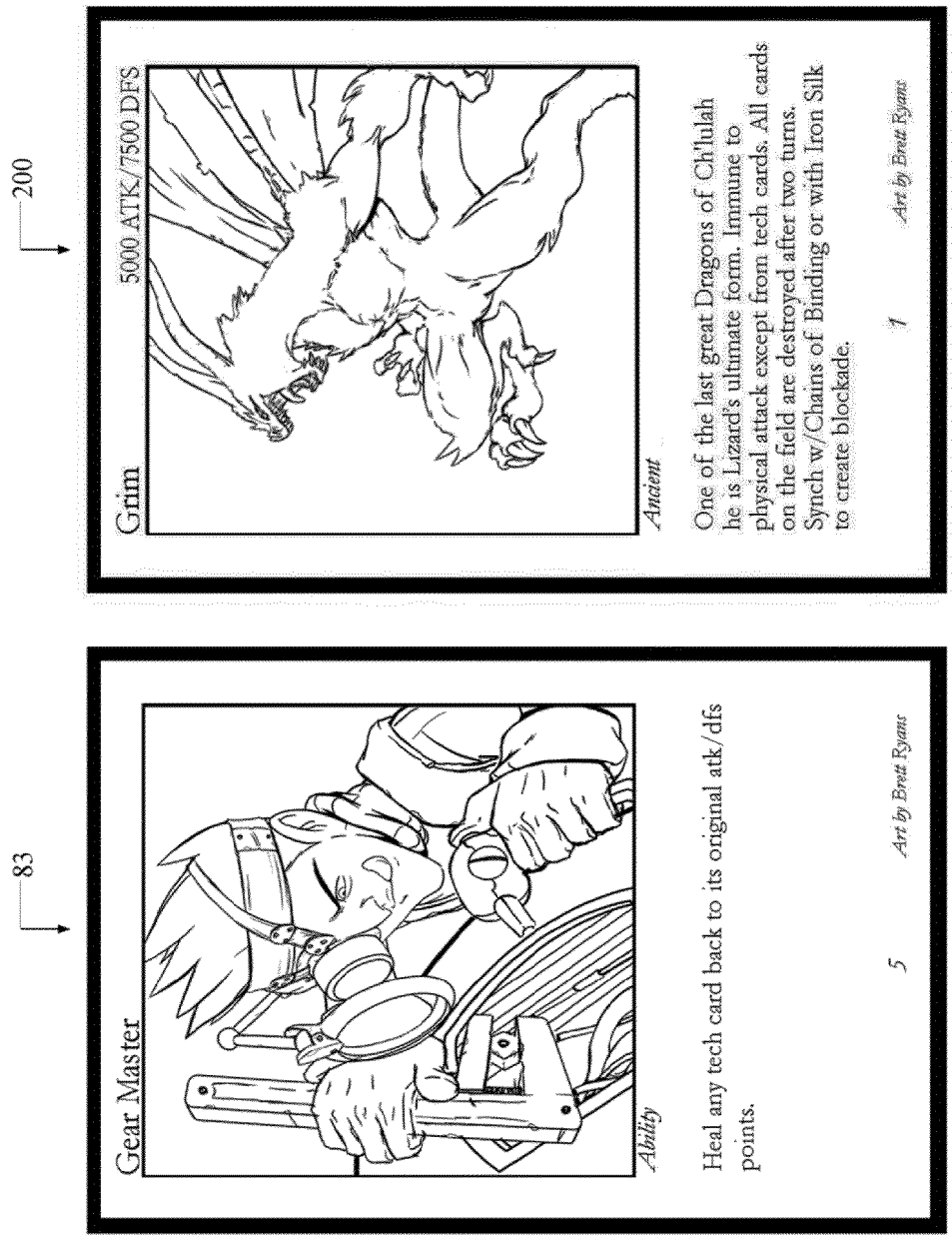
Fig. 2-D
Fig. 2-C

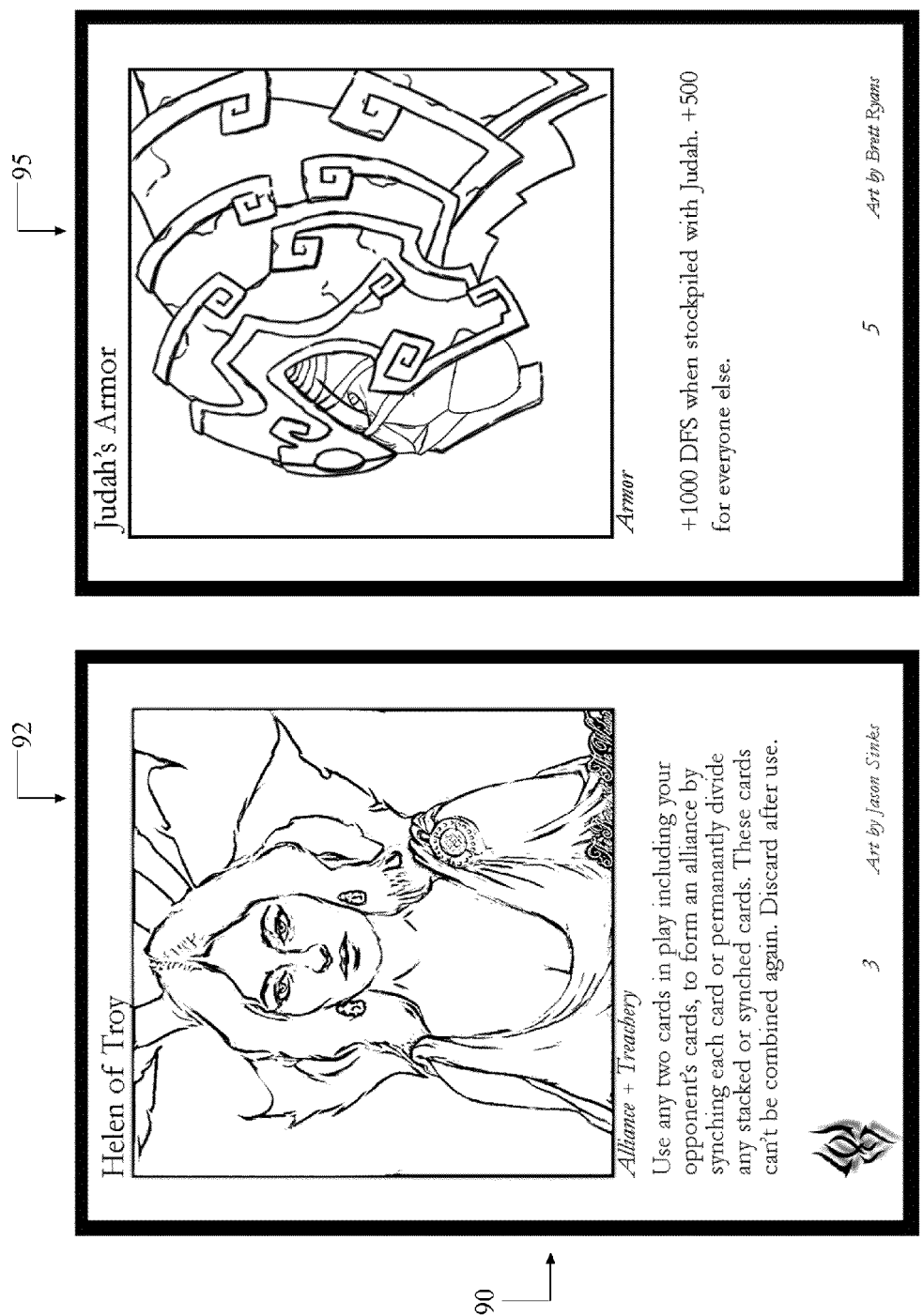
Fig. 3-B
Fig. 3-A

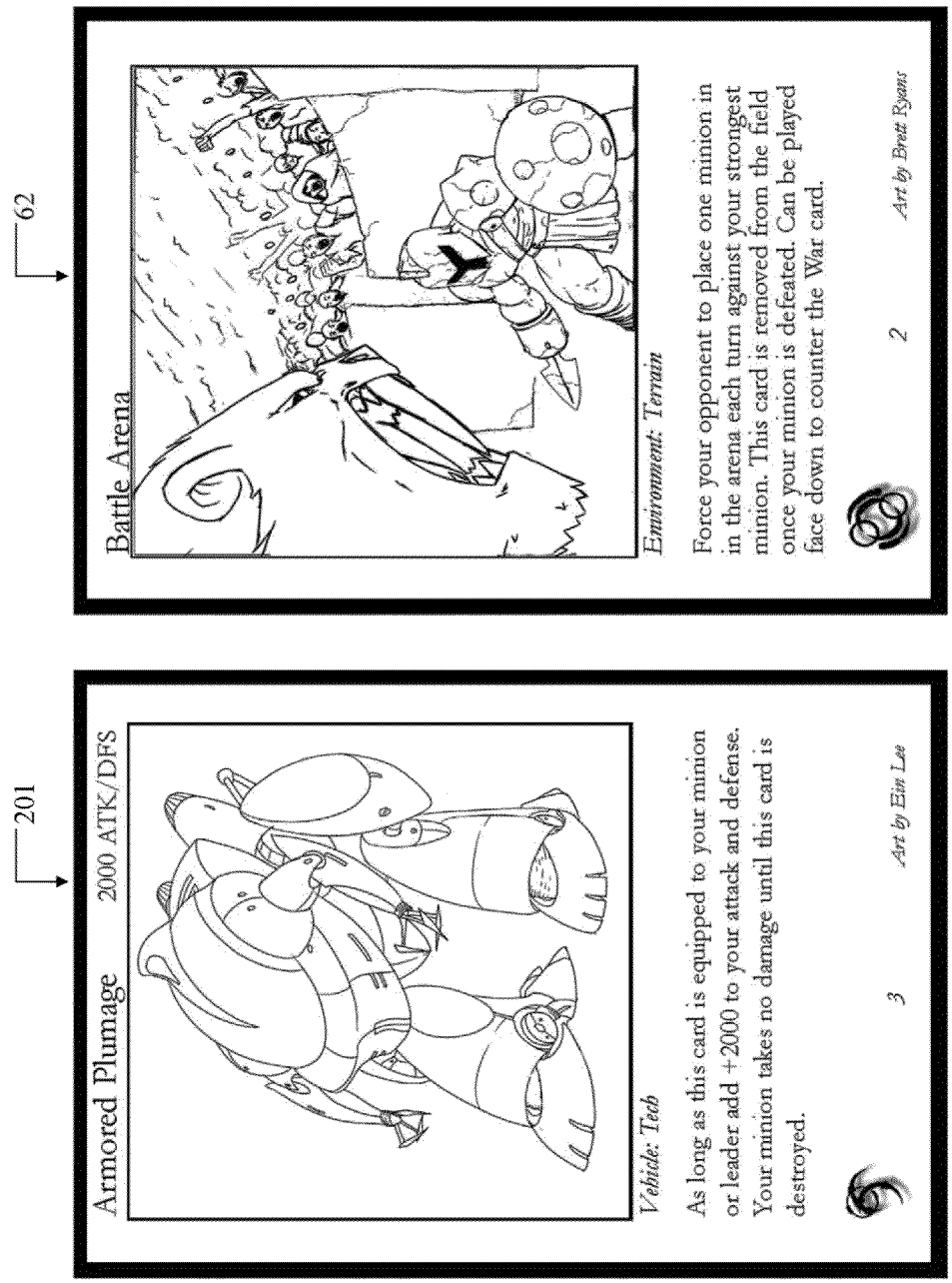
Fig. 3-D
Fig. 3-C

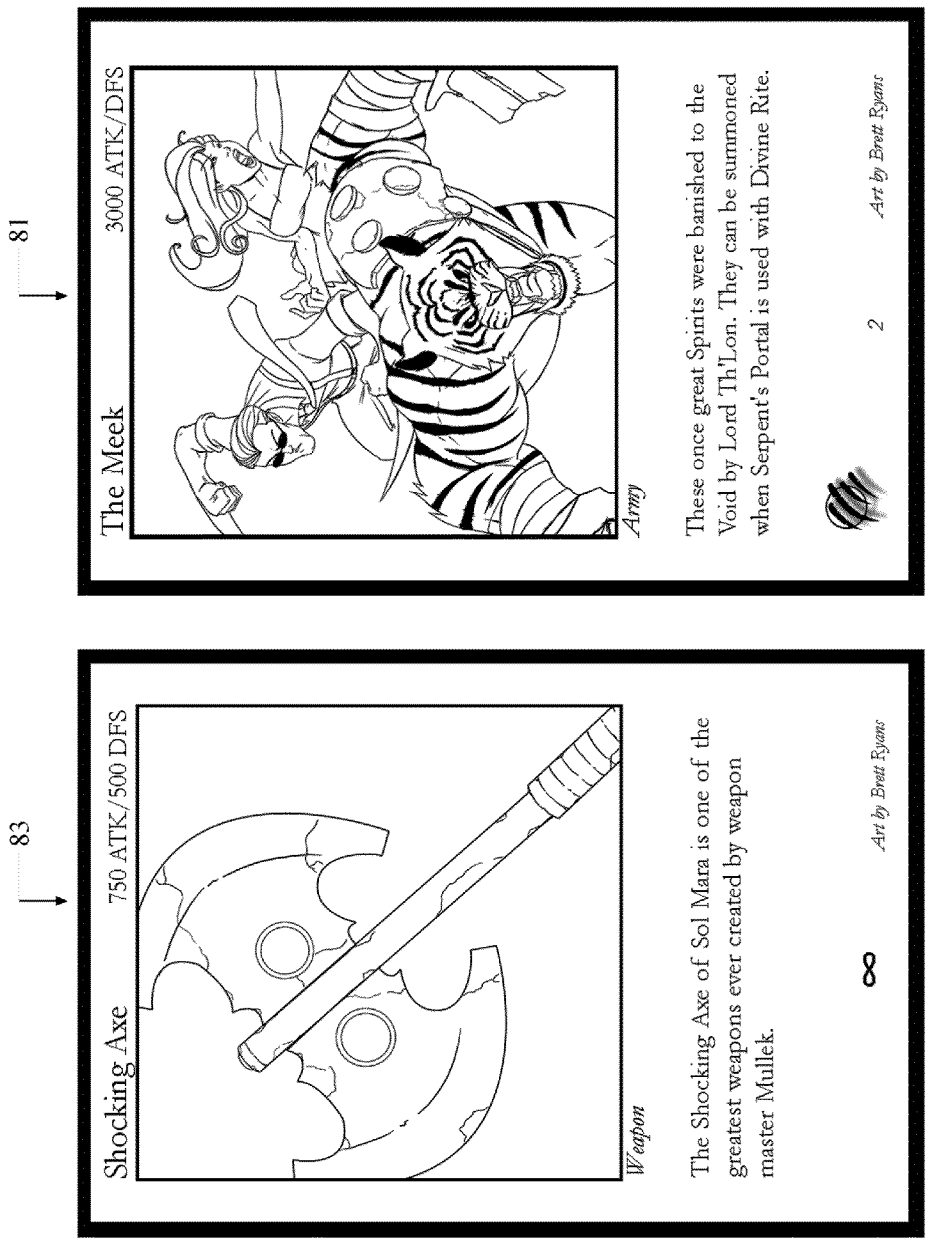
Fig. 4-B
Fig. 4-A

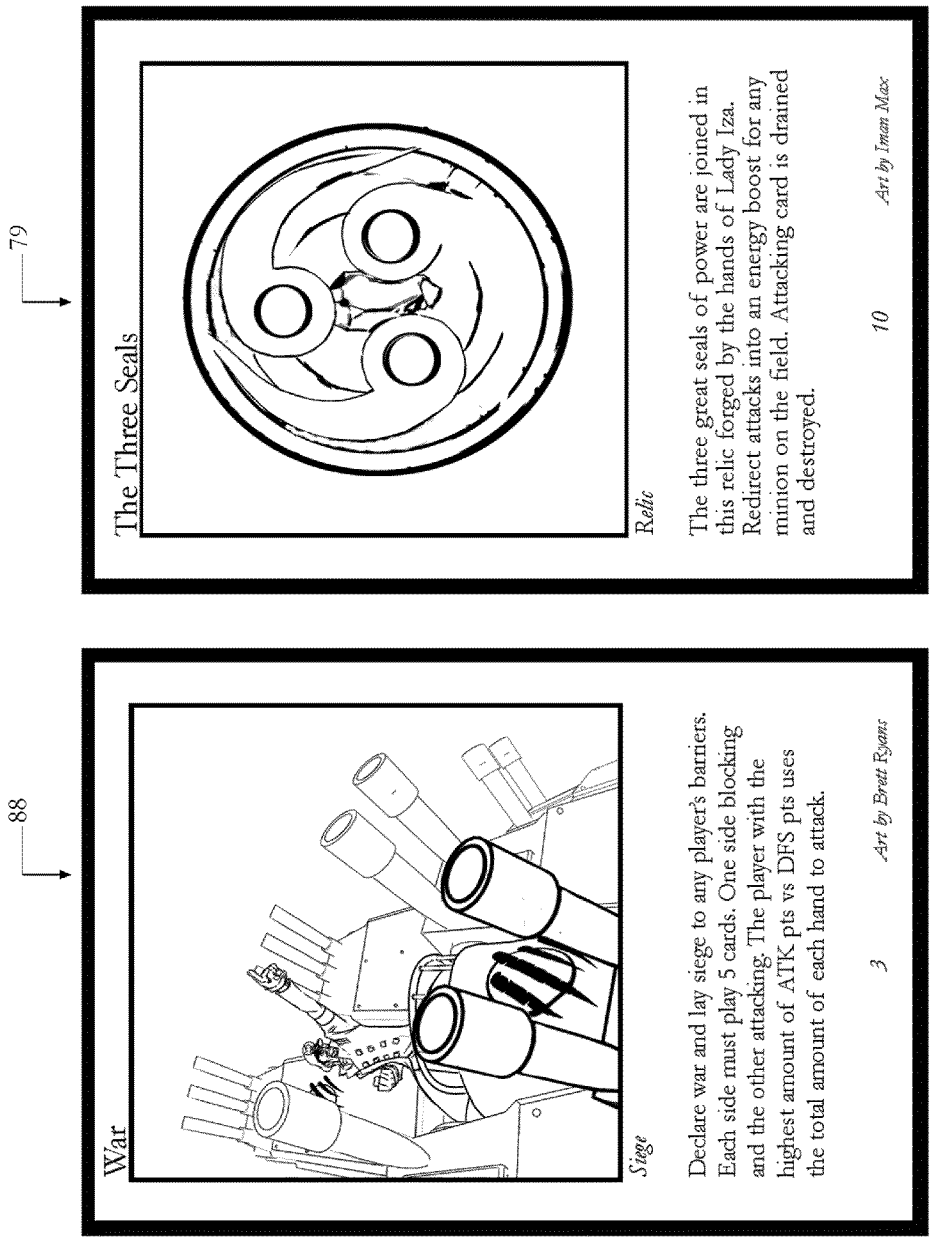
Fig. 5-B
Fig. 5-A

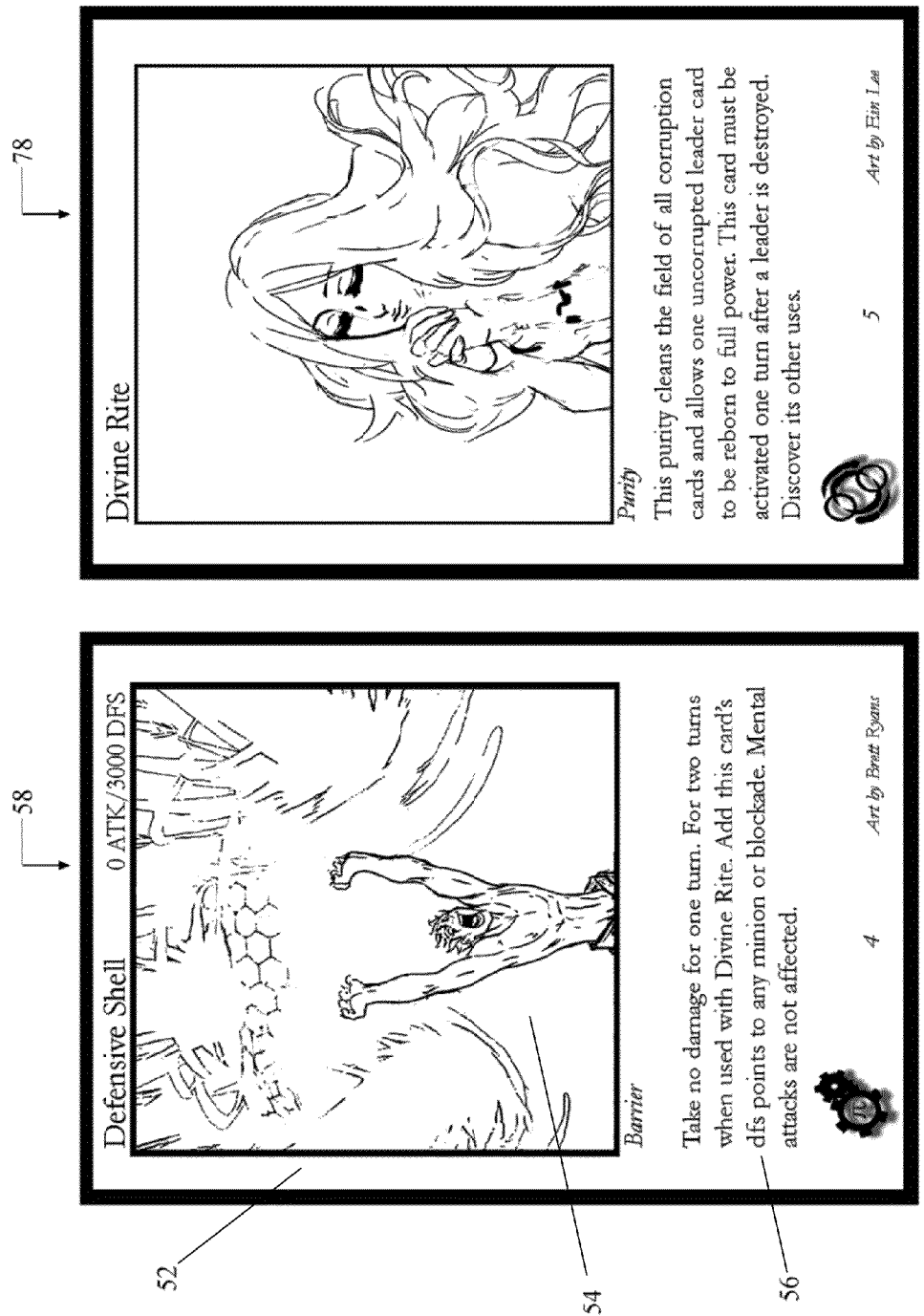
Fig. 6-B
Fig. 6-A

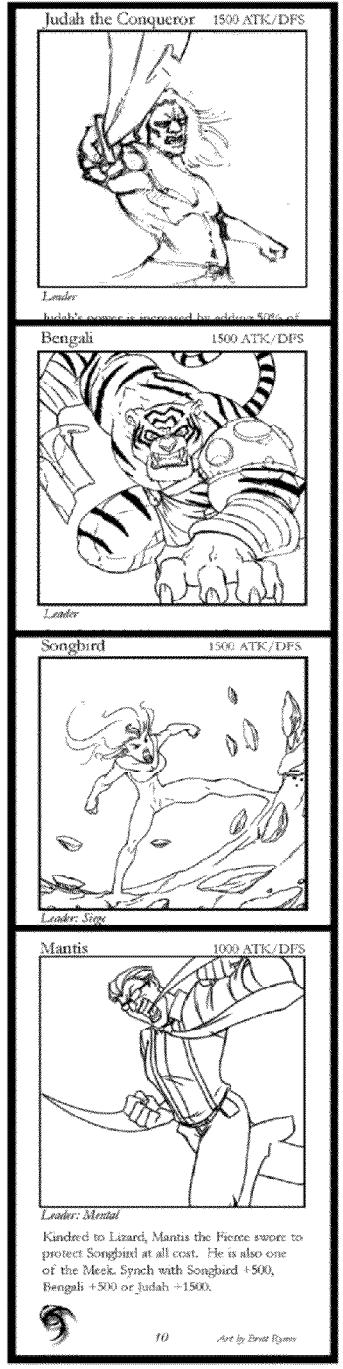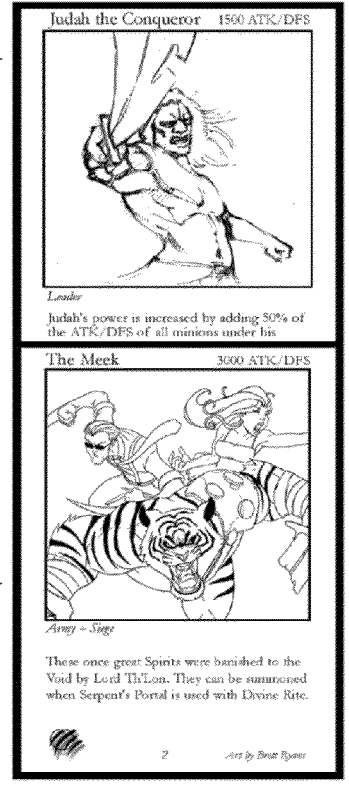
FIG.9

FIG. 16-A

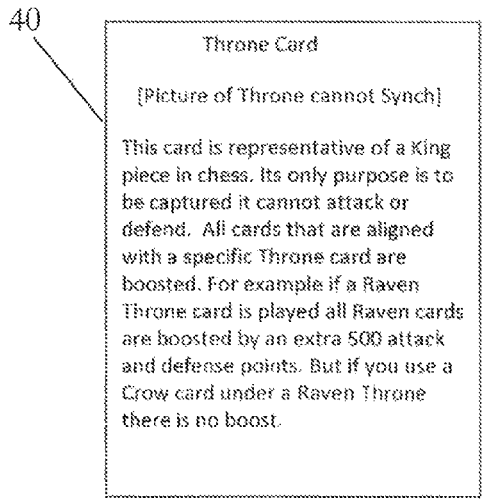

40 — Throne Card

[Picture of Throne cannot Synch]

This card is representative of a King piece in chess. Its only purpose is to be captured it cannot attack or defend. All cards that are aligned with a specific Throne card are boosted. For example if a Raven Throne card is played all Raven cards are boosted by an extra 500 attack and defense points. But if you use a Crow card under a Raven Throne there is no boost.

FIG. 16-B

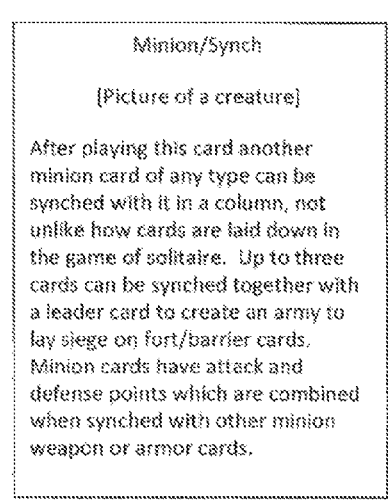

74 — Minion/Synch

[Picture of a creature]

After playing this card another minion card of any type can be synched with it in a column, not unlike how cards are laid down in the game of solitaire. Up to three cards can be synched together with a leader card to create an army to lay siege on fort/barrier cards. Minion cards have attack and defense points which are combined when synched with other minion weapon or armor cards.

FIG. 16-C

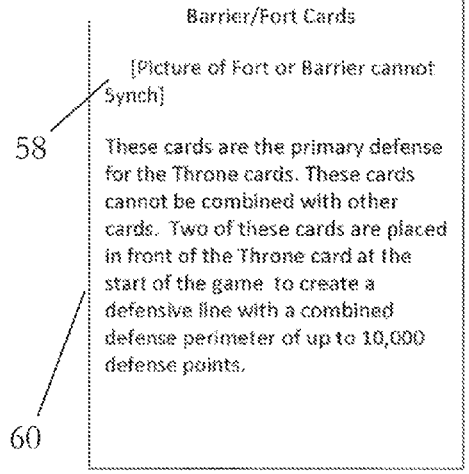

Barrier/Fort Cards

[Picture of Fort or Barrier cannot Synch]

58 — These cards are the primary defense for the Throne cards. These cards cannot be combined with other cards. Two of these cards are placed in front of the Throne card at the start of the game to create a defensive line with a combined defense perimeter of up to 10,000 defense points.

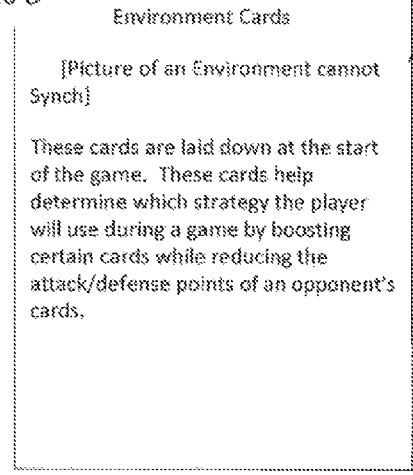

62 — Environment Cards

[Picture of an Environment cannot Synch]

These cards are laid down at the start of the game. These cards help determine which strategy the player will use during a game by boosting certain cards while reducing the attack/defense points of an opponent's cards.

FIG. 17-A

Greater Minions/Pets

[Picture of Mythical Beast can Synch]

These cards are all minion cards with an attack or defense rating of 2500 or more. Pets are directly linked to Throne cards and are boosted when played under a specific Throne card. Greater minion/Pet cards card be synched together to create an army with only two cards.

Siege

[Picture of a Battling Ram cannot be synched]

These cards allow the player to attack any Fort/Barrier card when played without having to create an army first.

Leader

[Picture of character(s) can synch]

When these cards are played they can be synched with minion cards to lay siege to an opponent's barrier or forts.

Weapons

[Picture of a sword, gun, mace can be synched]

All weapon cards can be synched with any leader, minion or greater minion card. Weapons boost the attack points of which ever leader/minion card they are synched with when played. These cards are placed under the leader, minion or greater minion card they are synched with.

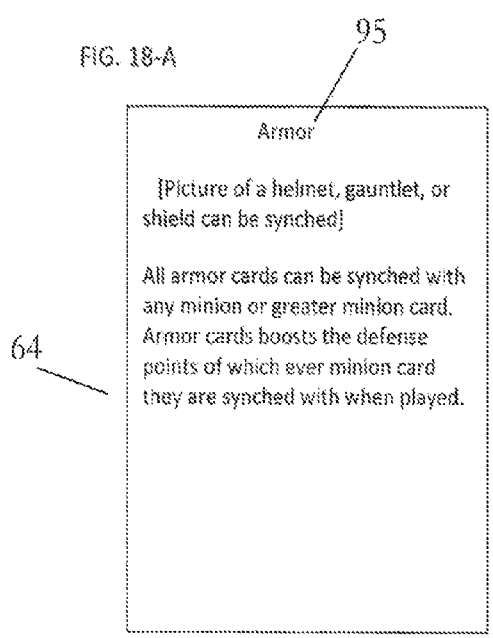

95 — Armor

[Picture of a helmet, gauntlet, or shield can be synched]

All armor cards can be synched with any minion or greater minion card. Armor cards boosts the defense points of which ever minion card they are synched with when played.

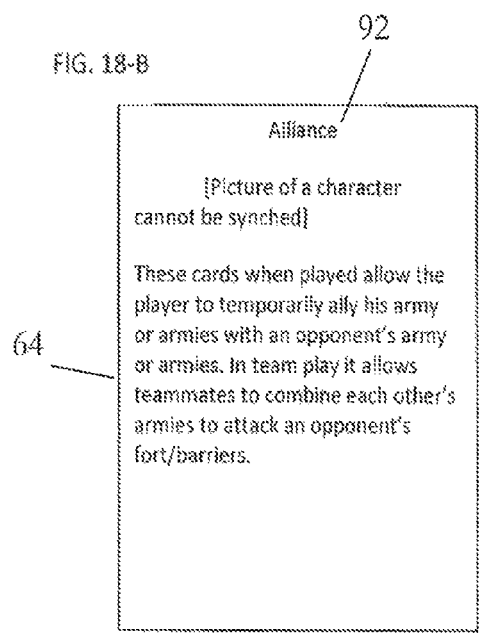

92 — Alliance

[Picture of a character cannot be synched]

These cards when played allow the player to temporarily ally his army or armies with an opponent's army or armies. In team play it allows teammates to combine each other's armies to attack an opponent's fort/barriers.

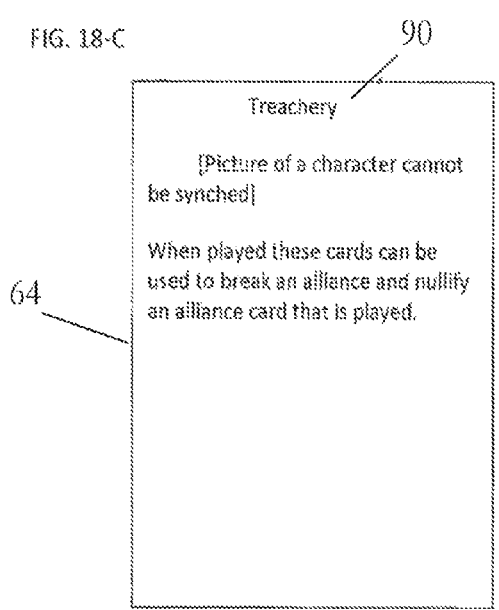

90 — Treachery

[Picture of a character cannot be synched]

When played these cards can be used to break an alliance and nullify an alliance card that is played.

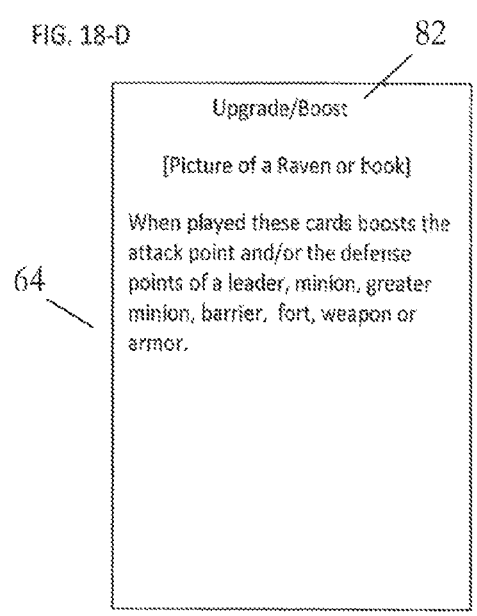

82 — Upgrade/Boost

[Picture of a Raven or Rook]

When played these cards boosts the attack point and/or the defense points of a leader, minion, greater minion, barrier, fort, weapon or armor.

64

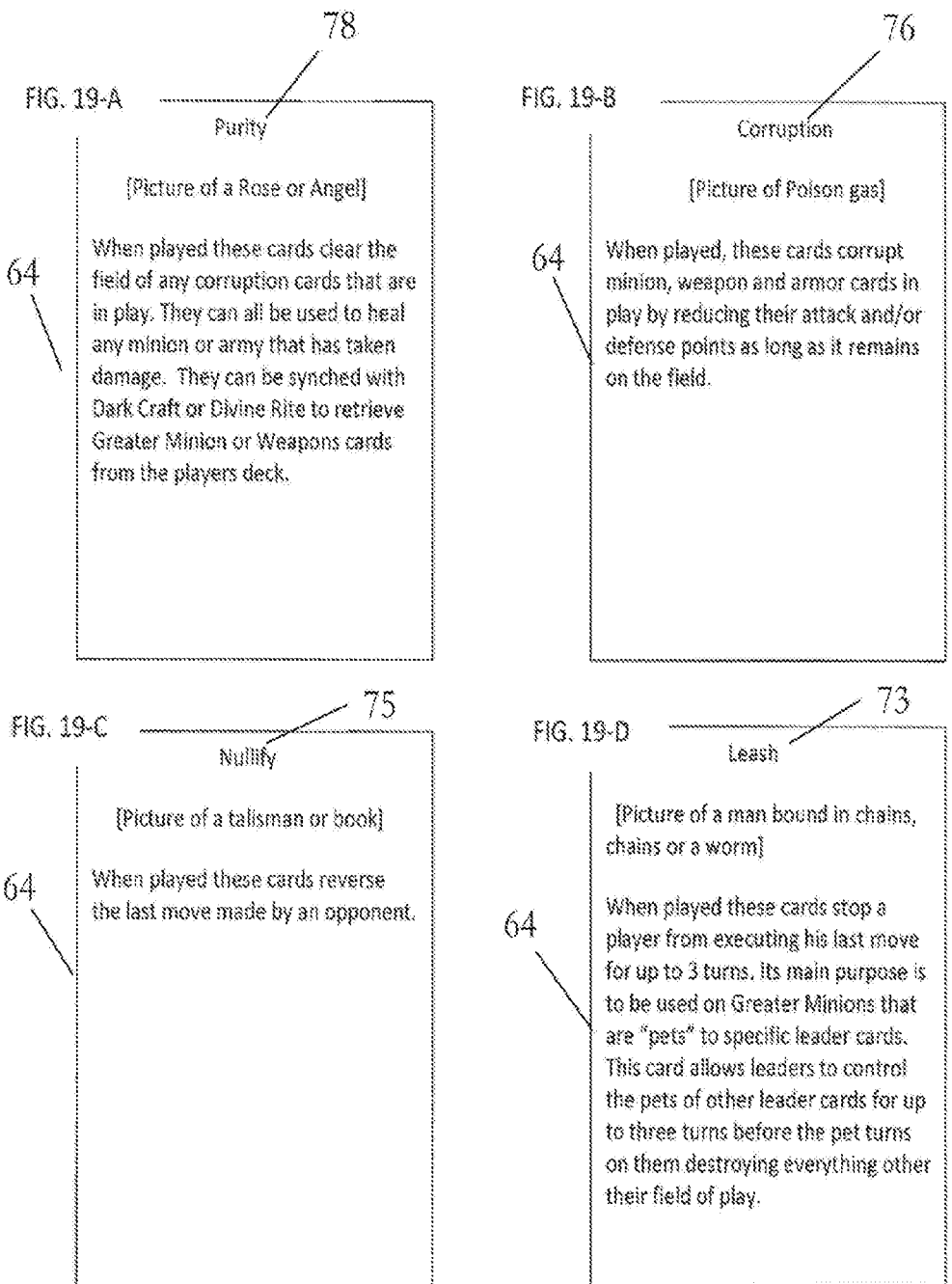

FIG. 20-A Relics/Ancient Relics

[Picture of a relic]

When these cards are played they allow the player to retrieve a card from his deck and then synch with it and put it in play. They can also boost any other card in the deck and can be character cards as well as weapon or armor cards. And can perform or enable a plurality of commands or abilities.

FIG. 20-B Hallowed Ground

[Picture of a playground, coliseum or mausoleum]

When these cards are placed on the field all attacks are reversed and minions, greater minions and weapons cards cannot be played for up to 3 turns.

FIG. 20-C Army

[Picture of an Army]

These cards can be used to replace up to 3 minion cards and one leader cards or 2 greater minion cards that have been synched together on the field.

FIG. 20-D Ultimate Purity

[Picture of a Willow Tree]

When this card is played it is an automatic win.

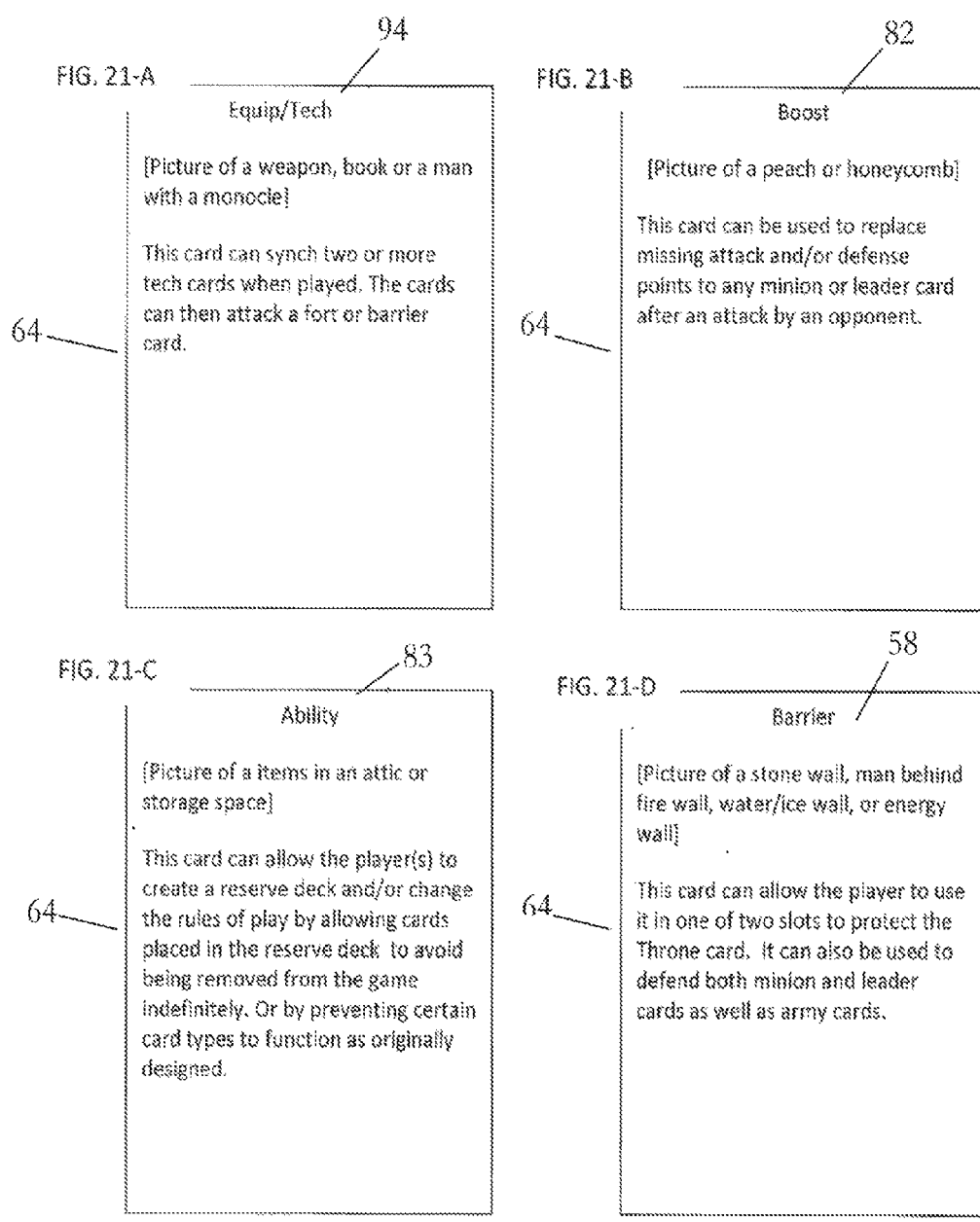

Annotations
1. Player's Throne Icon
2. Player's Name
3. Player's Barrier Defensive Health Meter
4. Player's Movement Meter
5. "End Turn" Button
6. Field of Play
7. Player 1's Field Cards
8. Player 2's Field Cards
9. Player 1 Barrier Cards
10. Player 2 Barrier Cards
11. Deck Cards
12. Void Cards
13. Player 1 Turn Cards tab
14. Tactics tab
15. Sample Turn Card Tile
16. Display area of Turn Cards

Use Case | Stacking | Equip a card on the battle field
3.0 Screen highlights the event and impacts of the chosen action.

Use Case | Stacking | Equip a card on the battle field
5.0 Resolve, "Brother Crow" card on battlefield is shown stacked with "Crow's Gauntlet".
5.1 Turn indicator is marked with shaded circle. Indicates 1 turn completed.
5.2 Turn Card space is marked "EMPTY". User can pick up a new card from the "Deck".

Use Case | Attacking | Engage an enemy on the battle field
2.0 The card's full size is displayed on screen.
2.1 Available actions for the card are listed to the right. Here the ARMY card can only engage an ATTACK option.
2.2 User selects the "Aequitas" enemy card for its attack.

TRADING CARD GAME AND METHOD OF PLAY

CROSS REFERENCE TO RELATED APPLICATION

This application claims priority to U.S. Provisional Application No. 61/787,089, filed Mar. 15, 2013, which is hereby incorporated by reference in its entirety.

FIELD OF THE INVENTION

The field of the present invention relates to games of strategy and chance and, particularly, stacking and stockpiling trading card games utilizing virtual or physical game components/cards for novel method of gameplay.

DESCRIPTION OF RELATED ART

Trading cards are used by many as a way of distributing and collecting information about a variety of topics. Topics range from educational information to comic book and cartoon characters. Popular examples of trading cards include well-known characters from Dragonball Z, Naruto, and Pokémon.

Since 1993, the year the "Magic: The Gathering" trading card game (hereinafter "Magic") was released, the popularity of trading card games significantly increased. In these and other types of trading card games, cards are traded and/or exchanged among fans and enthusiasts. By trading and exchanging cards, they seek to complete individual sets or decks of cards, which are often not readily available for purchase. Collection of cards in this manner allows a player to build decks of cards for use during game play. During a game, a player will then draw cards at random, after shuffling a deck. Each player then executes a series of actions such as drawing and discarding cards, according to rules of play.

Magic begins with each player placing his deck into a "library" and then drawing a set number of cards, namely seven (7) cards from the library. Magic cards are categorized into three basic card groups: character/creature cards, enhancing/land/mana cards, and variation/magic cards. Game play is based on "tapped" cards (cards placed sideways/horizontally) and "untapped" cards (cards placed straight up/vertically). Enhancing/land/mana cards allow a player to bring character/creature cards and variation/magic cards into play. In order to play one of these card types, a player must first "tap" an enhancing/land/mana card that is equal to the cost of mana (the cost characteristic), as indicated on the character/creature or variation/magic card. After each turn, a player "untaps" (turns straight/vertically) his "tapped" cards, draws a new card or cards from his "library" and, if any are left, plays one enhancing/land/mana card. These actions allow a player to bring a character/creature card into play and attack an opponent's card. Attack points (offensive characteristics) and defensive points (defensive characteristics) of the character/creature card(s) determine the outcome of an attack. One outcome is that either the player or his opponent has a card that "dies" and/or is destroyed. When this occurs one or more cards are placed in the "graveyard". The graveyard is a stack of cards that have been removed from the game for the remainder of gameplay.

The YU-GI-OH!™ trading card game (hereinafter "Yu-Gi-Oh") is another well-known card game, which was inspired by Magic. Differences between the two games include game jargon, card types, the numbering system for points, conflict naming (e.g. attacking an opponent vs. dueling with the opponent's monster cards), and the use of a side deck. Yu-Gi-Oh, for example, has equip, monster, spell and trap cards. Like Magic, Yu-Gi-Oh uses cards already in play to provide resources in order to continue and move the play of the game forward. Monster cards are used as enhancement cards that are "sacrificed" as payment to "summon" and bring other higher level monster cards and/or variation/spell cards into play. Yu-Gi-Oh utilizes a "turn based" system of play which uses "tapping". According to this system, if a monster card is placed face up and horizontally/sideways, then the card is in defensive mode where only the defensive points of the card are active and a player cannot use it to attack. When a monster card is placed vertically/straight up, the card is then considered to be in standard attack mode. In "turn based" play, each player is given the opportunity to do several things during a turn including but not limited to: 1) placing cards on the field of play in an attempt to lay a trap for an opponent by placing a trap and/or spell card face down, 2) putting a card on the field face up and vertically in attack mode or 3) placing a monster card on the field face up and horizontally in defense mode. This method of play utilizes strategies that allow the player(s) a chance to extend the conflict through the creation and use of new strategies. The player who has the best strategy and/or deck will become the winner.

While Magic, Yu-Gi-Oh, and other trading card games are useful for their intended purpose there is still a need for new and improved trading card games. The present invention fulfills this need and provides further related advantages as described below.

BRIEF DESCRIPTION OF THE DRAWINGS

FIG. 1-A shows one type of "throne" card.
FIG. 1-B shows one type of "minion" card.
FIG. 1-C shows one type of "leader" card.
FIG. 1-D shows one type of "fort" or "blockade" card.
FIG. 2-A shows one type of "leash" card.
FIG. 2-B shows one type of "corruption" card.
FIG. 2-C shows one type of "ability" card.
FIG. 2-D shows one type of "ancient" card.
FIG. 3-A shows one type of "alliance" and "treachery" card.
FIG. 3-B shows one type of "armor" card.
FIG. 3-C shows one type of "vehicle" card.
FIG. 3-D shows one type of "environment" card.
FIG. 4-A shows one type of "weapon" card.
FIG. 4-B shows one type of "army" card.
FIG. 5-A shows one type of "siege" card.
FIG. 5-B shows one type of "relic or ancient relic" card.
FIG. 6-A shows one type of "barrier" card.
FIG. 6-B shows one type of "purity" card.
FIG. 7-B shows an example of stockpiling with a secondary card.
FIG. 8-B shows an example of conscription stacking with secondary character leader cards being stacked onto the primary card shown in FIG. 8-A.
FIG. 8-C shows an example of conscription stacking with a tertiary character minion card being stacked onto a primary character leader card and secondary character leader cards.
FIG. 9-A shows one example of conscription stacking that creates a "loose" army.
FIG. 9-B shows an example of conscription stacking with a "swapped" and "condensed" army.

FIG. 16-A shows one type of "throne" card layout.

FIG. 16-B shows one type of "minion" card layout.

FIG. 16-C shows one type of "barrier/fort" card layout.

FIG. 16-D shows one type of "environment" card layout.

FIG. 17-A shows one type of "greater minion" card layout.

FIG. 17-B shows one type of "siege" card layout.

FIG. 17-C shows one type of "leader" card layout.

FIG. 17-D shows one type of "weapon" card layout.

FIG. 18-A shows one type of "armor" card layout.

FIG. 18-B shows one type of "alliance" card layout.

FIG. 18-C shows one type of "treachery" card layout.

FIG. 18-D shows one type of "upgrade" card layout.

FIG. 19-A shows one type of "purity" card layout.

FIG. 19-B shows one type of "corruption" card layout.

FIG. 19-C shows one type of "nullify" card layout.

FIG. 19-D shows one type of "leash" card layout.

FIG. 20-A shows one type of "relics/ancient relics" card layout.

FIG. 20-B shows one type of "hallowed ground" card layout.

FIG. 20-C shows one type of "army" card layout.

FIG. 20-D shows one type of "ultimate purity" card layout.

FIG. 21-A shows one type of "equip/tech" card layout.

FIG. 21-B shows one type of "boost/upgrade" card layout.

FIG. 21-C shows one type of "ability" card layout.

FIG. 21-D shows one type of "barrier" card layout.

DETAILED DESCRIPTION

Figure 7:
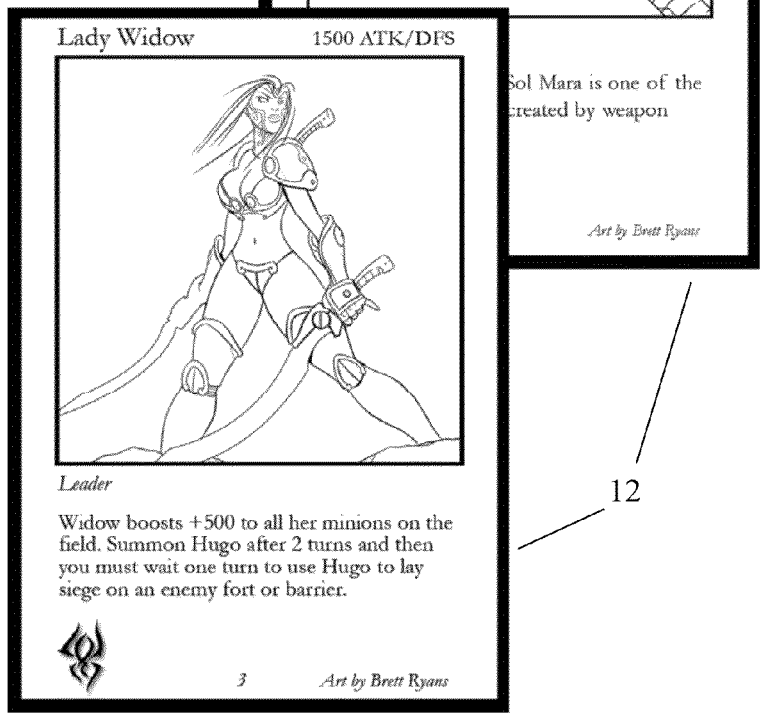
FIG. 7-A shows one example of stockpiling with a primary character card being stocked.

FIGS. 1-24 illustrate and describe game components/cards, game elements, and component/card layouts for a stacking and stockpiling trading card game 10. The game could be played by two or more players. The game could include a plurality of game components/cards 12, which could be in a virtual or physical form. A game component/card 12 may therefore have any shape and is not necessarily limited to a rectangular shape.

Game components/cards 12 can take varied forms. For example, game components/cards 12 may be hand-held trading cards. In other versions of the game, players may interact with virtual cards via gaming consoles, personal computers, cellular devices such as phones or tablets, and interactive applications and social media networks, which are accessed using computers, cellular devices, tablets, such that gaming components are displayed visually on a monitor or screen. Therefore, the present invention, including the tradable aspects thereof, is not limited to the embodiments described herein. In some embodiments, players use between 50 to 200 game cards/components during a game. Each game card/component 12 includes various images, indicia, text and/or other elements to facilitate game play, as shown in FIGS. 1A-6B, 13, 15 and 16A-21D. These figures each also illustrate a game component/card layout 15. FIG. 14 provides one example of a game cover 13, which includes SPIRIT REALMS™ trademark.

Figure 15:
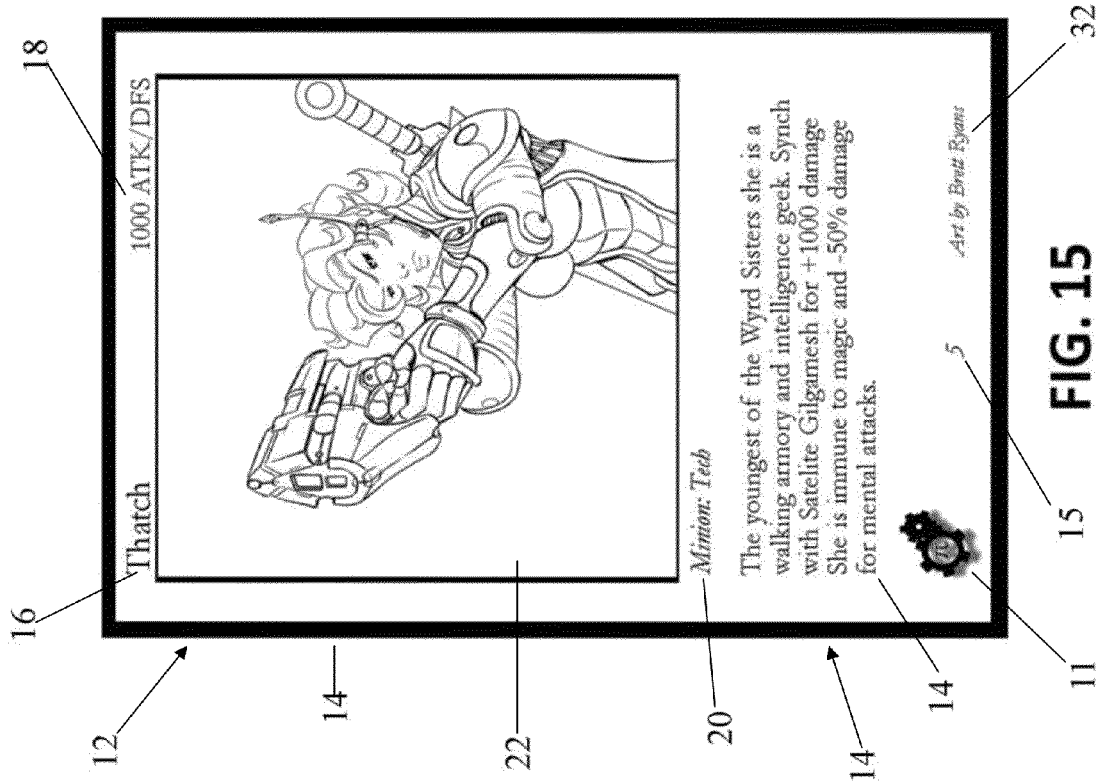
FIG. 15 shows another example of a type of card layout.

According to some embodiments, as illustrated in FIG. 15, each game card/component 12 may include a glyph/symbol 11 on a portion of the card and utilized to attack, defend, and modify character rules during game play. Each game card/component 12 may also include a number 15 printed on a portion of the card, indicating the maximum number of a particular card type a player may keep in their deck at a time.

Figure 11:
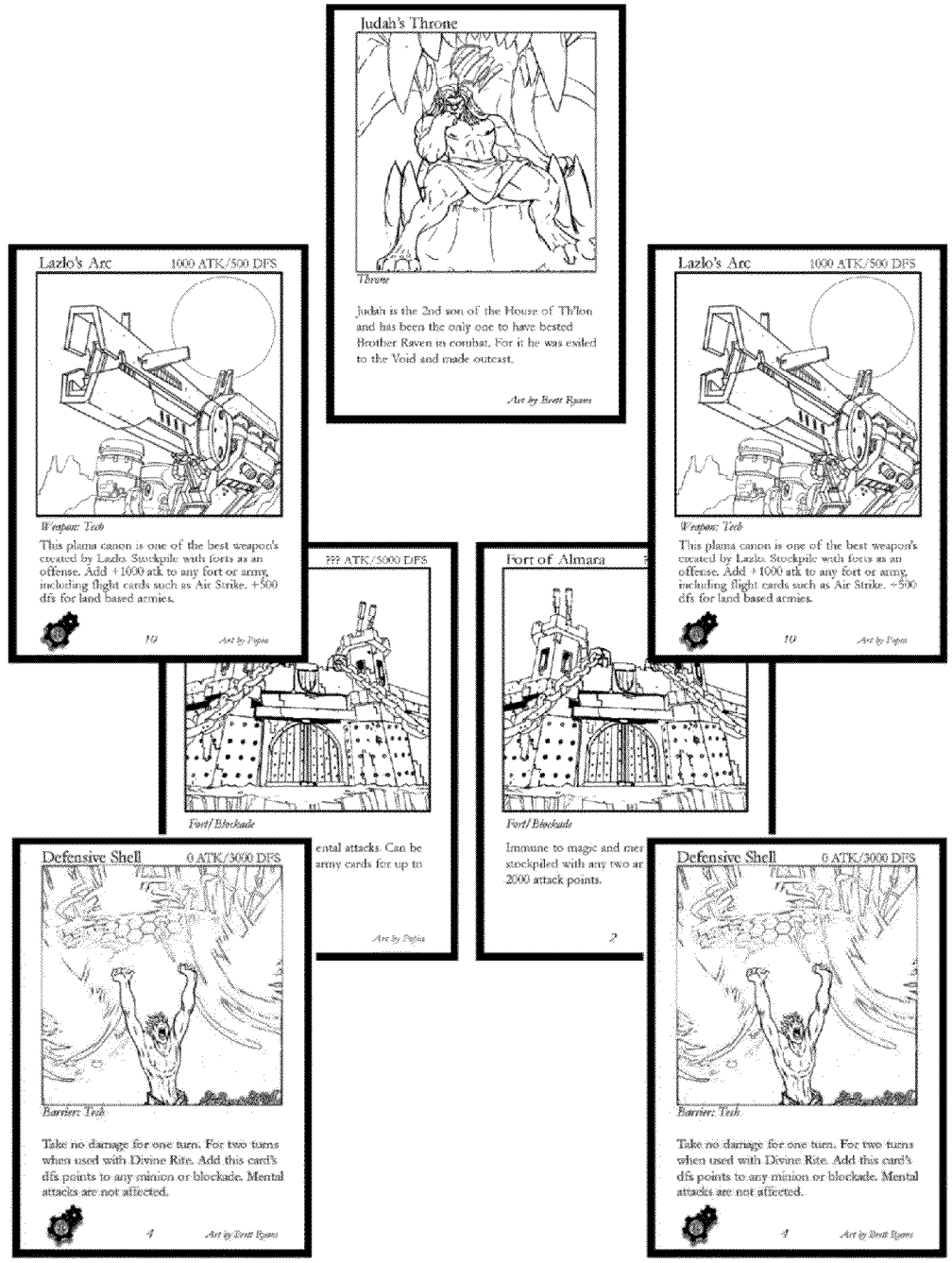
FIG. 11 shows one example, illustrating the stockpiling of forts.
Figure 12:
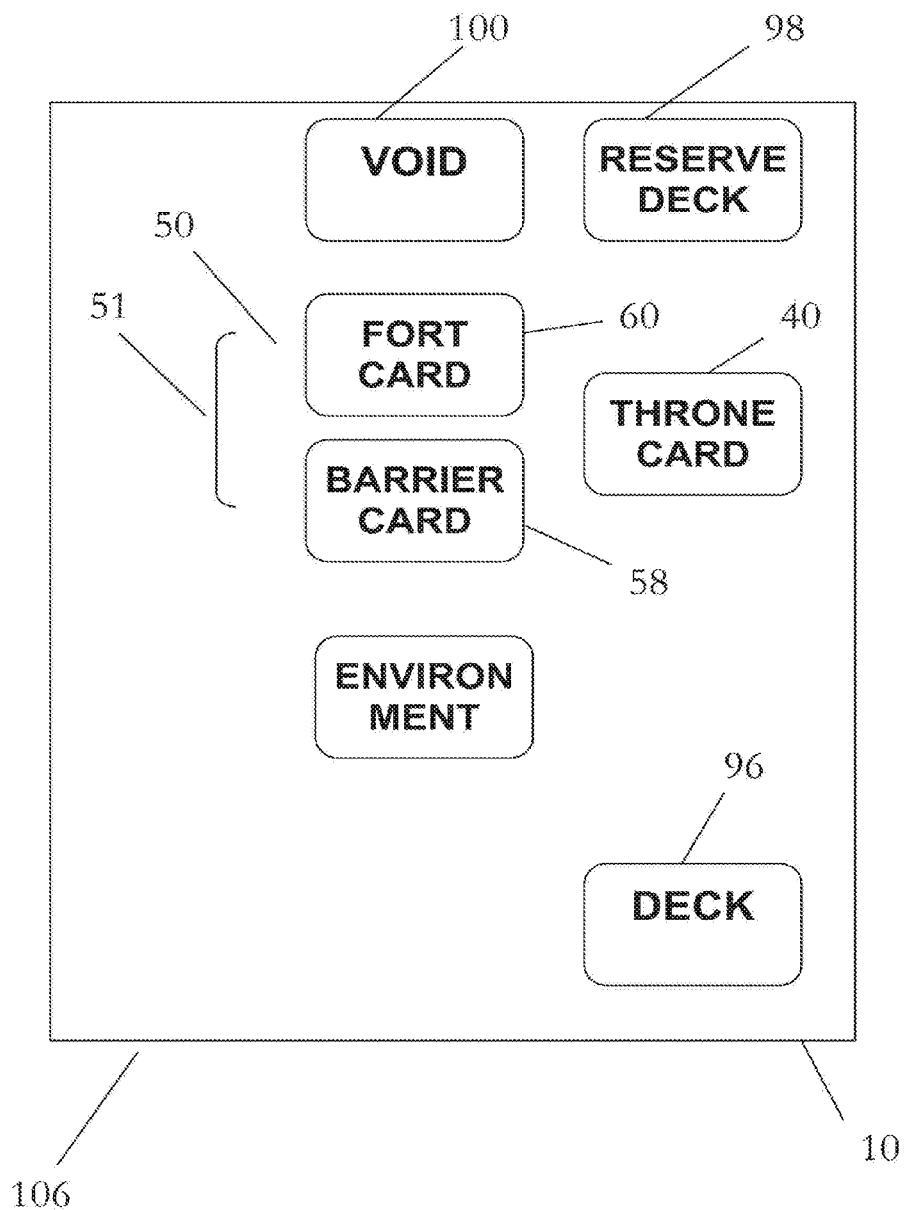
FIG. 12 shows one example of card placement on the layout in FIG. 10.
Figure 13:
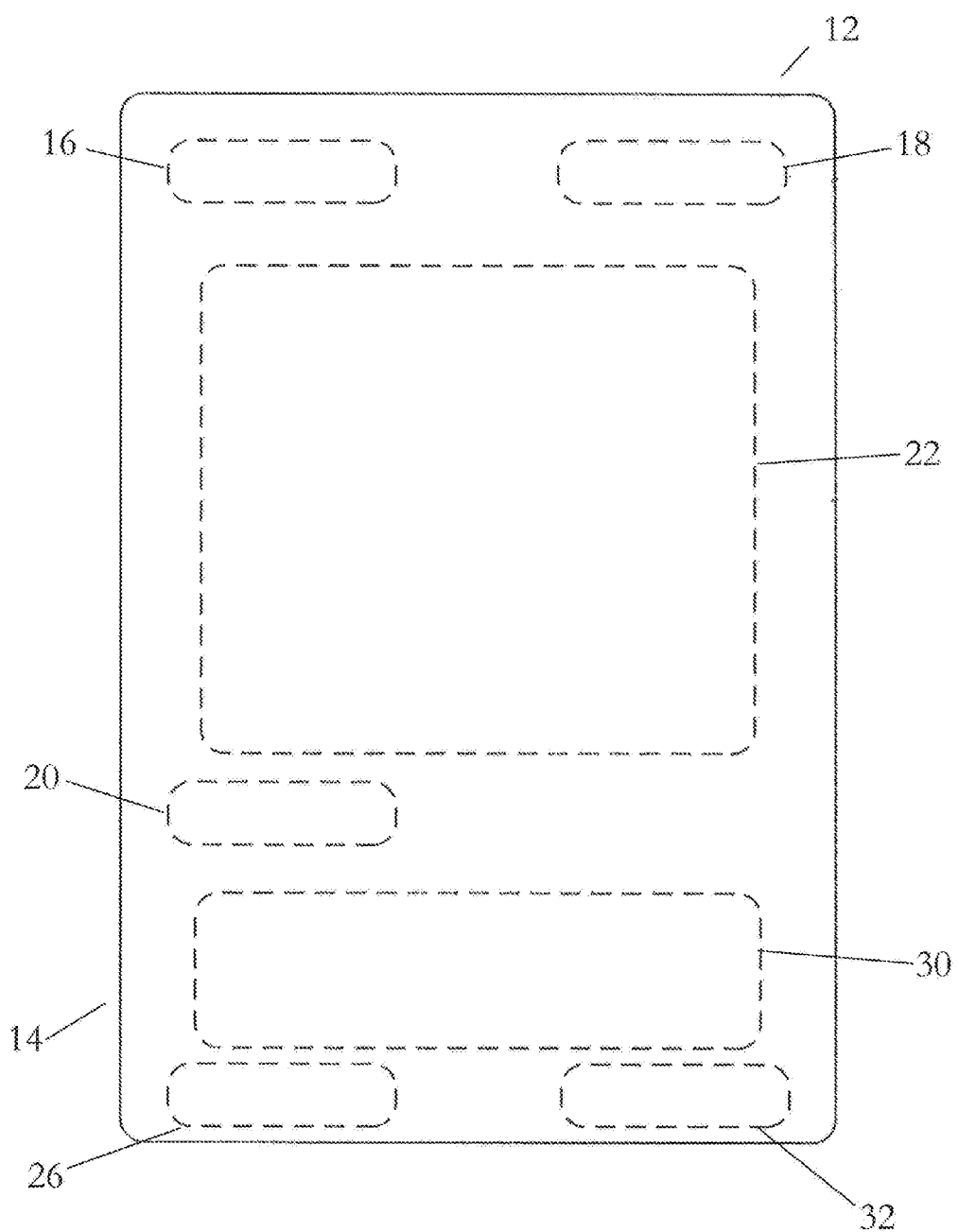
FIG. 13 shows an example of one type of card layout.
Figure 14:
FIG. 14 shows an example of a cover layout for the game.

FIG. 13 illustrates one embodiment wherein a game component/card layout 14 may include a title section 16, a point value section 18, a game card name section 20, an image 22, a symbol area 24 that includes one or more symbol areas 26, description text 30 and an artist acknowledgment text or copyright information area 32. These elements, however, may be designated according to specific categories that reflect the nature and purpose of the game component/card. The trading card game 10 may include, but is not limited to, one or more of the following categories of game components/cards:

Throne card 40—this card type is representative of a King piece in a chess game. As such, it is to be either protected or captured. This card cannot defend itself or attack other cards. Other cards, which are aligned with a specific throne cards, can have its point value boosted by association with a specific throne card. As shown in FIG. 1A, according to some embodiments, a throne card could include a sovereign image 42, a card type 44, sovereign description text 46, and artist acknowledgment text 32. In the throne card example shown in FIG. 1A, a male sovereign is shown. The sovereign image may include other types of sovereigns including kings In some embodiments, perimeter creation cards 50 can surround the throne card via perimeter 51, as illustrated in FIG. 12, and also defends the throne card 40. Each perimeter creation card could include a perimeter image 52, which may include an image of a power 54 (e.g. a frozen tundra barrier) and perimeter defensive text 56 that describes the effect of the power, as illustrated in FIG. 6A. Perimeter creation cards 50, could include, but are not limited to, one or more of the following card types:

Barrier cards 58 (FIG. 6A)
Fort cards 60 (FIG. 11)

According to some embodiments, environment cards 62 can be strategically positioned at the start of the game. They determine which strategy the player utilizes during a game, by boosting some of a player's cards and reducing the attack/defense points of an opponent's cards. An environment card 62, in one embodiment, is illustrated in FIG. 3-D.

Strategic cards 64 affect strategic game play. As illustrated in FIG. 1-C, these types of cards could include a strategic image 66 and strategic instruction text 68, which may also include one or more strategic altering components 70. The strategic image 66, strategic instruction text 68, and the strategic altering components 70 may be used alone or in some combination to indicate the type of strategy employed by the card. The remaining cards in the deck are considered strategic cards. These cards could include, but are not limited to one or more of the following: Corruption cards, Purity cards, Magic cards, Boost cards, Character cards, Weapon cards, Siege cards, Treachery cards, Alliance cards, Equip cards, and Tech cards. Each strategic card could also include strategic instruction text 68, with state altering components 70 and a strategic image 66. The state altering components 70 allow a player to change game components and rules of play. State altering components 70 include, but are not limited to, changing or modifying the effects of one or more of the following: game cards/components, existing rules, and a player's fort, barrier or minion card value, which requires both the elimination of other game components and the suspension of one or more rules of play. Strategic cards, could include, but are not limited to, one or more of the following card types:

Minion, Greater Minion, or Pet cards 74; FIG. 1-B
Leader cards 84; FIG. 1-C
Blockade or Fort cards 72; FIG. 1-D
Leash cards 73; FIG. 2-A
Corruption cards 76; FIG. 2-B
Ability cards 83; FIG. 2-C
Ancient cards 200; FIG. 2-D
Treachery 90 and Alliance cards 92; FIG. 3-A
Armor cards 95; FIG. 3-B
Vehicle cards 201; FIG. 3-C
Weapon cards 83; FIG. 4-A
Army cards 81; FIG. 4-B
Siege cards 88; FIG. 5-A
Relics or Ancient Relics 79; FIG. 5-B
Purity or Ultimate Purity cards 78; FIG. 6-B
Boost/Upgrade cards 82; FIG. 18-D
Equip/tech cards 94; FIG. 21-A
Barrier cards 58; FIG. 6-A In another embodiment, game component/cards 12 can be traded by each player to create individual playing decks. While game components/cards may be duplicated, some cards may have fewer duplicates than others. For example, one type of throne card may be sold as a limited edition card.

Figure 10:
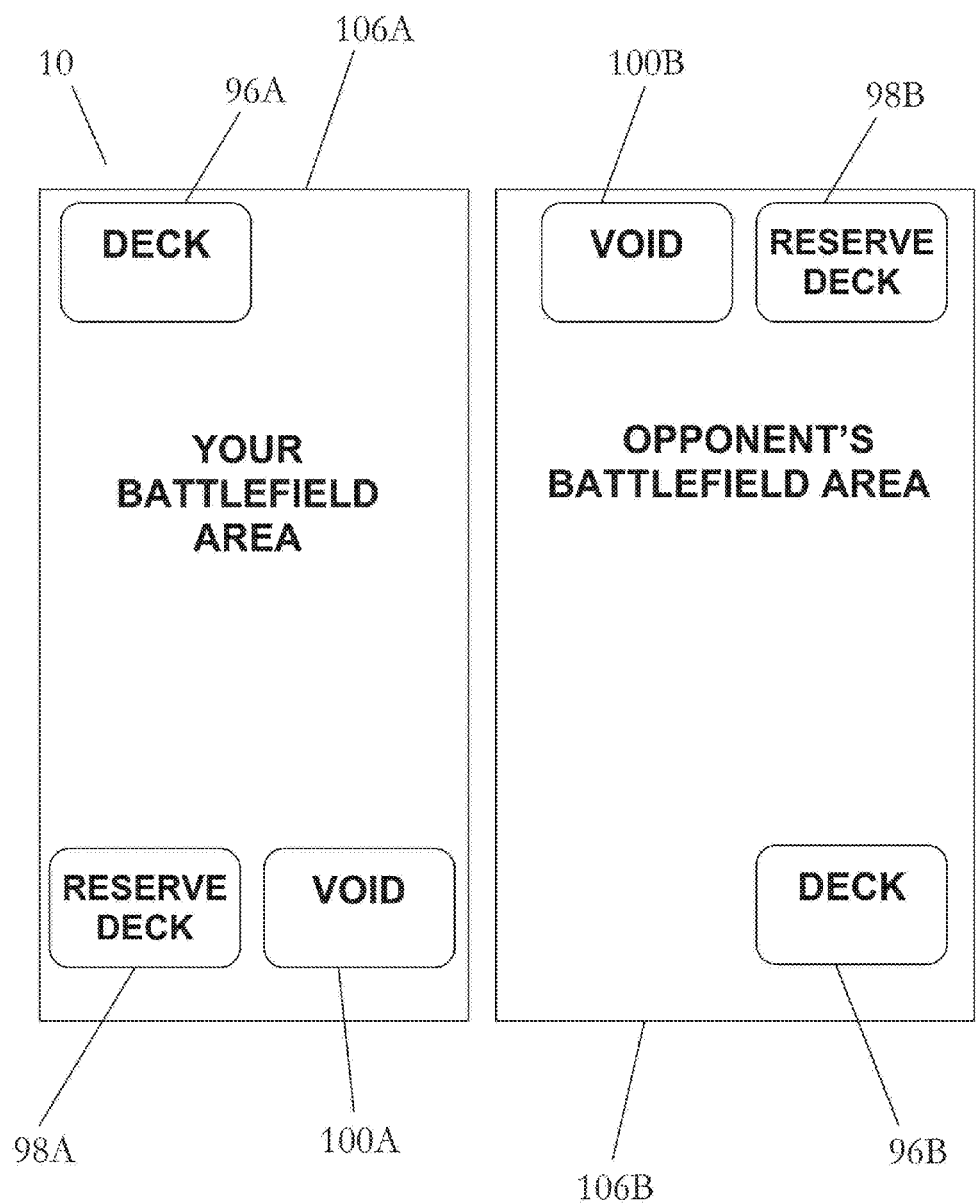
FIG. 10 illustrates the layout of a playing surface for two players.

In some alternative embodiments, players established their decks by drawing a plurality of cards from their respective deck. The initial plurality of cards drawn by each player could range between five and seven cards. Each player will position a drawing deck 96, a reserve deck 98, and a void deck 100 on a virtual, physical, or imaginary gaming area 102. The gaming area 102 includes a battlefield 106 for each player. FIG. 10 shows one example of a gaming area 102 including a first battlefield 106a for player one and a second battlefield 106b for player two.

FIG. 12 shows one possible arrangement of the drawing deck 96, the reserve deck 98, the void deck 100, the throne card 40, the Environment card 62, and the perimeter creation cards 50 (a Barrier card 58 and a Fort card 60) on a battlefield 106. Each game component/card 12 is considered to be either in an "active" or a "passive" state of play. The throne card, for example, remains in a "passive state" for the duration of the game unless it is replaced with another card per game rules. Cards are considered "in play" whether on the field, in a hand or in the deck. In any of these states of play a game component/card can be attacked, defended, or modified.

In another embodiment, at the beginning of the game, a player will set up a defensive perimeter 108 near or around the throne card. This perimeter could include at least (1) one fort, one barrier and one environment, or (2) two fort cards and one environment card. To create a perimeter, a player positions cards on his/her battlefield such that the perimeter cards surround the throne card. The perimeter may be positioned near or around the throne card in any manner. In some arrangements, however, the perimeter cards encircle the throne card such that a 360° perimeter is established. As more perimeter cards are obtained, a wider perimeter may be established.

During a turn, a player is provided with a maximum number of "movements" to complete an "Action." The player consolidates a certain number of game components, in a strategic and specific way, to create a new set of cards for attacking and destroying an opponent's perimeter such that the throne card can be captured.

The game also includes a method for tracking barrier and/or fort value(s) so that players know that when their barrier and/or fort value(s) have been reduced to zero and the throne card captured thereby eliminates the player from the game. Players are also allowed to combine characteristics, powers and/or abilities of two or more cards through two systems called "Conscription" stacking and "Stockpiling."

In some embodiments, boost cards, ability cards, magic cards, blockade cards, siege cards, and character cards could affect a player or their opponent's cards.

In another embodiment, players take turns executing a sequence of actions, each sequence is called an "Action" and each step in an "Action" is called a "Movement." A movement could comprise of drawing, playing and discarding cards in accordance with the rules of play until the game ends. For initial game play, each player can make five active and/or passive actions to play per stage. In a typical battle, each player has a defensive value assigned to two barrier or two fort cards or one barrier and one fort card. When a player's barrier card(s) and/or fort card(s) defensive value has been reduced to zero (0) and the throne card is attacked and captured, the player is eliminated from the game.

Figure 8:
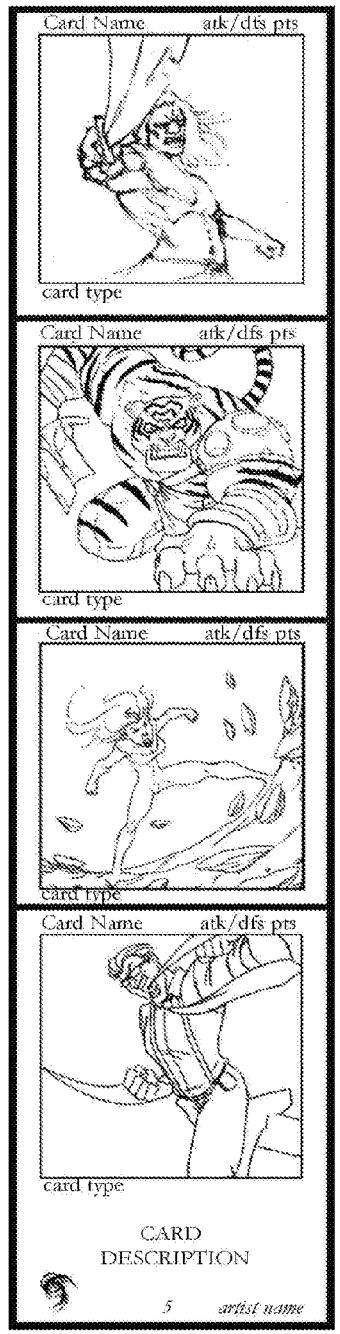
FIG. 8-A shows one example of conscription stacking with the primary character leader card being stacked and an army that is created for attack.

In other embodiments, each player is required to create an army. Army creation could be accomplished by selecting and combining a chosen "leader" card with lower ranking minion cards and/or lower ranking leader cards, called "conscription" stacking. Specifically, "Conscription" stacking, as shown in FIG. 8-A thru 8-C, is the act of placing at least one minion card or leader card, on top of a primary leader card at the lower half of the card, with the specific purpose of creating an army. The attack value of the cards being stacked onto a leader card, including the leader card, must total, in this embodiment, at least 2,500 attack points before a player is able to attack the opponent's barrier card and/or fort cards that are protecting the throne card. A player can swap out his combined minion cards and/or leader cards known as a "loose army" for a singular army card, as shown in FIG. 9-A and FIG. 9-B. A leader card, in this embodiment, regardless of its attack value, cannot attack a barrier card or fort card without being combined with minion cards or at least one army card. Each player is given two slots that lay just before the throne card as shown in FIG. 12. In one embodiment, each player will utilize minion cards to create armies. These armies are used to attack and destroy blockade cards (e.g. barrier cards and fort cards). Once the blockade cards have been destroyed the player then uses an army or another card with at least 2500 attack points for a final attack sequence to capture the throne card.

In some methods of playing the game, each player selects and "stockpiles" a particular fort card or leader card, which enables each player to forgo creating an army. "Stockpiling" a leader card, as shown in FIG. 7-A thru 7-B, is the act of placing a single weapon card (offensive characteristic), a single armor card (defensive characteristic), or a plurality of weapon and/or armor cards under or on top of a main card. Cards with attack points only are placed at the top left corner of the main card and cards with defense points only and cards with both attack and defense points, are placed in the top right corner, wherein the offensive characteristic (attack points) and/or the defensive characteristic (defense points) are added together. Alternatively, when stockpiling a fort, the throne card must be present, wherein the weapon cards (attack characteristic) and the barrier cards (defensive characteristic) are placed on the outer edges of the Fort cards as shown in FIG. 11. Weapon cards are placed on the upper edges whereas barrier cards are placed on the lower edges of the fort cards.

In an alternative embodiment, each player can agree to forgo the creation of their armies or can sacrifice their armies, and instead stockpile one of the aforementioned cards to a predetermined attack value and/or defense value. Each player stockpiles one or more character cards using only the cards in his "hand." The player that has stockpiled his cards to at least 2500 attack points can attack both his opponent's minions and/or the barrier cards that remain until each defense value reaches zero. Once the defensive value of a player's primary barriers protecting the throne card reaches zero and the throne card is captured, the game is over. In accordance with another method of the game, according to some embodiments, players can play a siege card on the field to lower the "Wall to Action," which enables a player to attack an opponent's fort and/or barrier cards without having the required amount of attack points. At any point during the turn, when a siege card is being played, the other player can counter by playing a blockade card. Each player must then draw five cards from either their reserve or regular deck, and lay them in a row as shown in FIG. 13. The player who started the siege also has the option of using any army card(s) the player has in play on the field. Once each player utilizes all five cards, the player who played the siege must count their card's attack points and his opponent must count his own cards defense points. The player who has the most combined points of their characteristic can attack their opponent's barriers. During the siege part of the game, cards with no attack points or defense points are counted as zero (0).

Alternatively, according to some embodiments, during the game's siege portion, players can opt to have each individual card stand on its own, wherein every card, whether it has an offensive characteristic, defensive characteristic or neither, can be utilized during the siege phase of the game.

In another method of play, according to some embodiments, each player can steal an opponent's armies and use them to create a defensive perimeter. If an opponent is forced to attack their own army after a player steals it, the opponent loses the game. A player can steal an opponent's character, weapons and armor cards with the use of "passive" state cards such as, but not limited to, one or more of a treachery, alliance or corruption card. When an armor or weapon card has been stolen, it is turned in the opposite direction. Furthermore, when a player has lost an army to an opponent, the leader card is placed at the bottom of the conscription stacked cards and all cards in the combined stack are turned in the opposite direction. Once this happens, the player is forced to attack and remove this "lost army" from play first before he can attack his opponent's cards in the first movement of their next turn.

In one method of game play, according to another embodiment, a battle arena card enables a player to select a 'champion' from his deck. While playing this card, a player cannot use any other card. The opponent must keep drawing and playing his cards to battle the 'champion' until the 'champion' is defeated. The challenging card always goes first. The winning card does not remain on the battlefield and returns to the bottom of the deck. This card can only be removed after the 'champion' has been defeated. Normal play will not continue unless this card is removed. If the 'champion' cannot be defeated, it automatically captures the opponent's Throne.

Another method of game play, according to some embodiments, is based on reducing or increasing the "Wall to Action" which can be described as the number of steps or "movements" in an "Action" required to execute a certain outcome. Each player is given five movements per turn to execute an action. A player can reduce the number of movements or increase the number of movements for an opponent. In this way, a player can also reduce the time it takes to complete a particular action. Players who are able to reduce the "Wall to Action" for themselves can, amongst other options, add more barrier cards, set up to three more cards to surround the throne card, or build armies faster. Players who increase the "Wall to Action" for opponents can, amongst other options, keep their opponents from building armies or adding more barriers to their perimeter.

Another method of game play, according to some embodiments, is based on the form of play where a player is able to sacrifice one of their armies on the field in order to add an extra fort card to the perimeter of his throne card. A player can sacrifice up to a total of four armies in order to create a wider perimeter of forts to protect the throne card.

Another method of game play, according to some embodiments, is based on each player obtaining an opening hand of at least 54 cards, of which their deck comprises. Each player must execute a turn in order to play a minion, leader and other aforementioned cards, i.e. FIG. 1A thru FIG. 6D to attack, defend and modify the game rules, with the intention of destroying or remove an opponent's barrier cards to capture the throne card. The steps, each known as an Action, comprise a predetermined number of movements. A player can perform, but is not limited to, the following action sequence:

First Action
1. Lay down a throne card and the place two fort cards or one fort card and one barrier card directly in front of the throne card to create a perimeter. In addition, place one Environment card either to the right or left of the perimeter.
2. During the first play ONLY, play one character card at the same time to determine who is first. The player with the highest attack point value proceeds first.

Second Action

1. Draw five to seven cards from a deck to your hand.
2. Lay down one army, minion or leader card on to the battlefield.

Third Action

1. Primary Movements include at least one of, but are not limited to, the following:
   a. Attack—Attack an opponent's minion, army, barrier or fort. In one embodiment, An opponent's Minions on the field should be destroyed before the fort or primary barriers are attached, unless a siege card is used.
   b. Stay—A player allows both his card and an opponent's card to stay on the field of battle unharmed. During this stage, each player is allowed to place one extra card on the battlefield without losing a turn, which includes, but is not limited to:
      i. Add at least one card to (i.e., an army, minion or leader card) in an effort to create, grow or swap an army,
      ii. Place at least one card on the field from a deck or hand in an effort to modify game rules in the next movement,
      iii. Set up a new environment,
      iv. Stockpile forts with either one barrier or one weapon card,
      v. Lay down a blockade card,
      vi. Create and place up to five cards into a reserve deck; only if Toys in the Attic card is in play.
   c. Defend—A player can chose not to attack but rather allow his opponent to attack and use counter moves. Alternatively, in some embodiments, a player may place an environment card face down, resonate, or synch the environment card with other cards. A player can also choose to add more barriers to widen the perimeter around his throne card by sacrificing an army.
   d. Build or Break—A player can "build" or "break" an alliance by playing an alliance or treachery card. A player can also re-enforce his barriers after a siege. Furthermore, a player can lay down leader and minion cards to create an army; See "Conscription" stacking
   e. Siege—A player may play a siege card such as War, which lowers the "Wall to Action." By lowering the "Wall to Action," a player no longer has to create an army or have a minimum amount of 2500 attack points in order to attack an opponent's barriers and/or forts.
   f. Blockade—A player may play a blockade card, which increases the "Wall to Action" by setting up an immediate defense to any siege, at which point each player must draw five cards and place them in a row facing each other. The player with the most attack points relative to the opponent's defense points wins this part of the game.
   g. Attrition—The action of stealing an opponent's weapons, armor and armies and using them to form a perimeter to defend your throne card. In order to win, an opponent is forced to destroy their cards before an opponent attacks a player's cards. Destroying cards compromises the opponent's ability to attack and defend their barrier and fort cards.
   h. Conscription—Combining at least two, but no more than five character cards, to create an army with a primary leader card at the top and the remaining cards below it, as illustrated in FIG. 8A thru 8-D.
   i. Stockpile/Stockpiling—The action of combining an army, leader, or minion card with one armor or weapon card or a fort card with one weapon or barrier card, unless otherwise stated in rules of play.
   j. Swapping—Swap out any "loose" armies created with minion or leader cards for a "condensed" army within the same type and class. A condensed army comprises a combined army of undead minions (e.g. two or more undead minion cards), of which can only be swapped with a single army card of undead minions, unless otherwise stated on the card or in the rules of the game system.
   k. Synching—The action of combining two or more cards, including but not limited to, army cards and "loose" and/or "condensed" armies through the use of a tertiary card for a particular action (i.e. attack, defense or modifying game rules).
   l. Resonance/Resonate—The action of combining cards with the same glyphs printed on the card for the purpose of attack, defense, modifying character cards or modifying rules of play.
   m. Quick Action Play—This is a form of play wherein, if a player cannot form an army or stockpile a leader or fort, the player can battle using the cards left in his hand and/or deck(s). The battle comprises either of (1) simultaneously playing five cards face up with the opponent or (2) laying down five cards face down each turn and simultaneously turn them face up. For both forms of play a player accrues wins when his card's attack points is higher than the opponent's defensive points. Furthermore, in both forms of play, the player with the most wins within three turns automatically destroys one of the barriers or forts protecting a throne card. If there are cards with no attack or defense points the following rules, of which are not limiting, apply: Character cards beat Ability/Equip cards, Ability/Equip cards beat Magic cards, Magic cards beat Character cards and Structure cards beat all cards.
   n. Leash—This group of cards is designed for the purpose of controlling a Greater Minion "Pet" card, that is not of the same class or type as the player's throne card. "Pet" cards are Greater Minion cards that can only be used on specific throne cards. Leash cards allow a player to control another throne's pet for a limited number of turns. Leash cards also allows a player to both decrease his "Wall to Action" and increase his opponent's "Wall to Action." Increasing an opponent's "Wall to Action" allows a player to harness a Greater Minion of a different class or type with a higher attack and defensive characteristic without having to utilize the throne or leader card necessary to have the Greater Minion on the field of play.
   o. Tribute—This is a form of play where a player penalizes an opponent for going over the number of movements allowed per turn. The penalty comprises, but is not limited to, the sacrifice of a high level character card, such as a Greater Minion or an Army card, for a predetermined number of turns. A player forces the opponent into a "Wall" for up to two turns. The player then turns his card or cards face down, which then prevents the opponent from attacking the face down cards until a "Wall," expires. A "Wall" can last for more than two turns. Another form of penalty is forcing your opponent to discard one of his cards.

Figure 22:
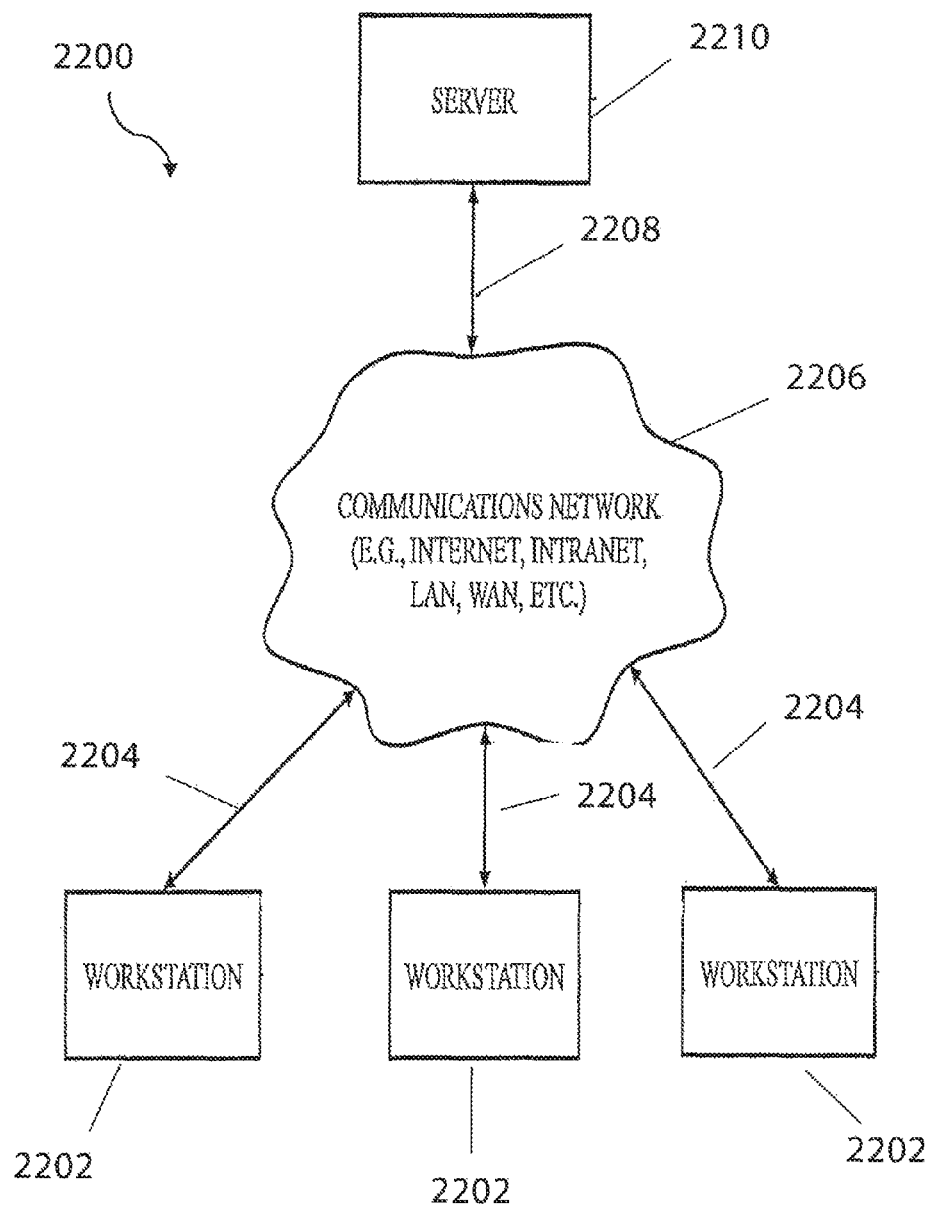
FIG. 22 shows a generalized computer network to facilitate game play.

FIG. 22 illustrates a generalized schematic diagram of a system 2200 on which an interactive user display application may be implemented in accordance with some embodiments of the present invention. As illustrated, system 2200 may include one or more workstations 2202. Workstations 2202 may be local to each other or remote from each other. Workstations 2202 are connected by one or more communications links 2204 to a communications network 206 that is linked via a communications link 2208 to a server 2210.

System 2200 may include one or more servers 2210. Server 2210 may be any suitable server for providing access to the application, such as a processor, a computer, a data processing device, or a combination of such devices. Communications network 2206 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 2204 and 2208 may be any communications links suitable for communicating data between workstation 2202 and server 2210, such as network links, dial-up links, wireless links, hard-wired links, any other suitable communications links, or a combination of such links. Workstations 2202 enable a user to access features of the application. Workstation 2202 may be personal computers, laptop computers, mainframe computers, dumb terminals, data displays, Internet browsers, personal digital assistants ("PDAs"), smartphones, tablets, multimedia devices, two-way pagers, wireless terminals, cellular phones, portable telephones, handheld devices, any other suitable access device, or any combination of such devices. Workstations 2202 and server 2210 may be located at any suitable location. In one embodiment, workstations 2202 and server 2210 may be located within an organization. Alternatively, workstations 2202 and server 2210 may be distributed between multiple organizations.

Figure 23:
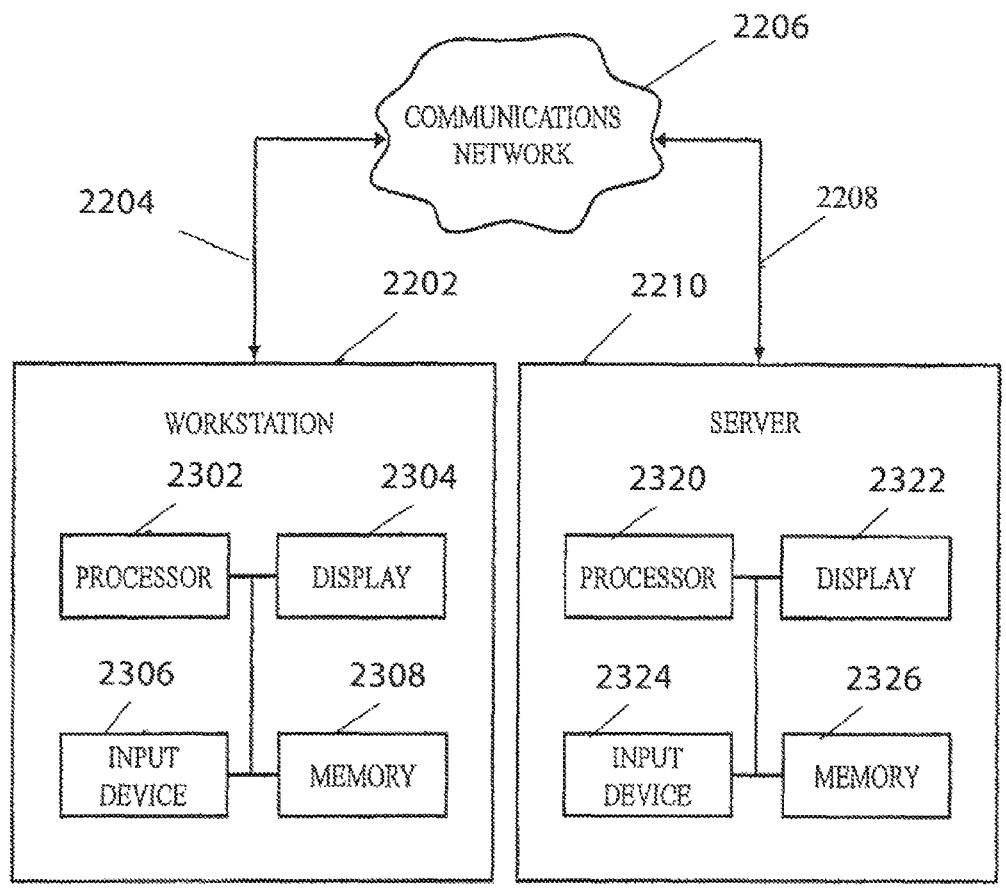
FIG. 23 shows a detailed computer network to facilitate game play.

The server and one of the workstation computers, which are depicted in FIG. 22, are illustrated in more detail in FIG. 23. Referring to FIG. 23, workstation 2202 may include processor 2302, display 2304, input device 2306, and memory 2308, which may be interconnected. In another embodiment, memory 2308 contains a storage device for storing a workstation program for controlling processor 2302.

Processor 2302 uses the workstation program to present on display 2304 the application and the data received through communications link 2204 and commands and values transmitted by a user of workstation 2202. It should also be noted that data received through communications link 2204 or any other communications links may be received from any suitable source. Input device 2206 may be a computer or device keyboard, a cursor-controller, dial, switch bank, lever, or any other suitable input device as would be used by a designer of input systems or process control systems. In some embodiments, input device 2206 may be an instrument with a Musical Instrument Digital Interface (MIDI), which enables, computers, and other suitable equipment to communicate, control, and synchronize with each other.

Server 2210 may include processor 2320, display 2322, input device 2324, and memory 2326, which may be interconnected. In some embodiments, memory 2326 contains a storage device for storing data received through communications link 2208 or through other links, and also receives commands and values transmitted by one or more users. The storage device further contains a server program for controlling processor 2320.

In some embodiments, the application may include an application program interface (not shown), or alternatively, the application may be resident in the memory of workstation 2202 or server 2210. In another suitable embodiment, the only distribution to workstation 2202 may be a graphical user interface ("GUI") which allows a user to interact with the application resident at, for example, server 2210.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, an automobile PC, a laptop computer, tablet, multimedia device, a cellular phone, a personal digital assistant ("PDA"), smartphone, etc., to provide such features.

It will also be understood that the detailed description herein may be presented in terms of program procedures executed on a computer or network of computers, which represents well known systems to implement the instant invention. These procedural descriptions and representations are the means used by those skilled in the art to most effectively convey the substance of their work to others skilled in the art.

Figure 24:
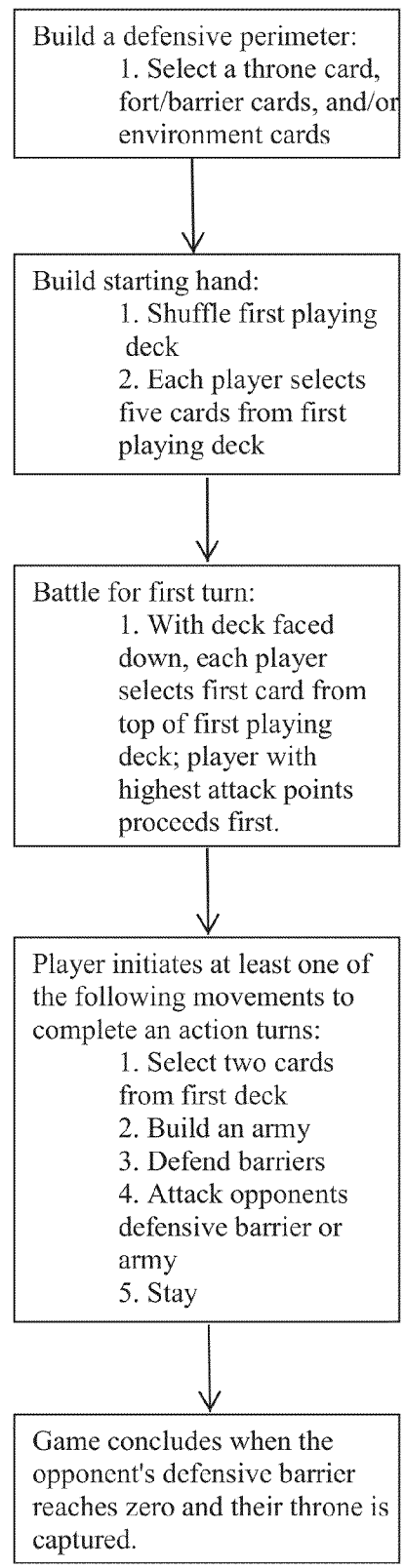
FIG. 24 shows a method of playing the game.

FIG. 24 describes a method of game play, wherein players first build a defensive perimeter by selecting a throne card, in addition to a combination of fort, barrier, and environment cards. Players then build a starting hand by shuffling a first playing deck and selecting the first five cards from the top of the deck. Next, players battle for the first turn by selecting the first card from the top of the deck, wherein the players compare the attack points of their respective selected card; the player with the higher attack value proceeds first. After, the first player initiates an action turn by performing five movements, which include, but are not limited to, at least one of the following actions: selecting two cards from the player's first deck, build an army, defend barriers, attack the opponent's army or defensive barrier, or stay. Once the opponent's defensive barrier reaches zero and their throne is captured, the game concludes.

Figure 25A:
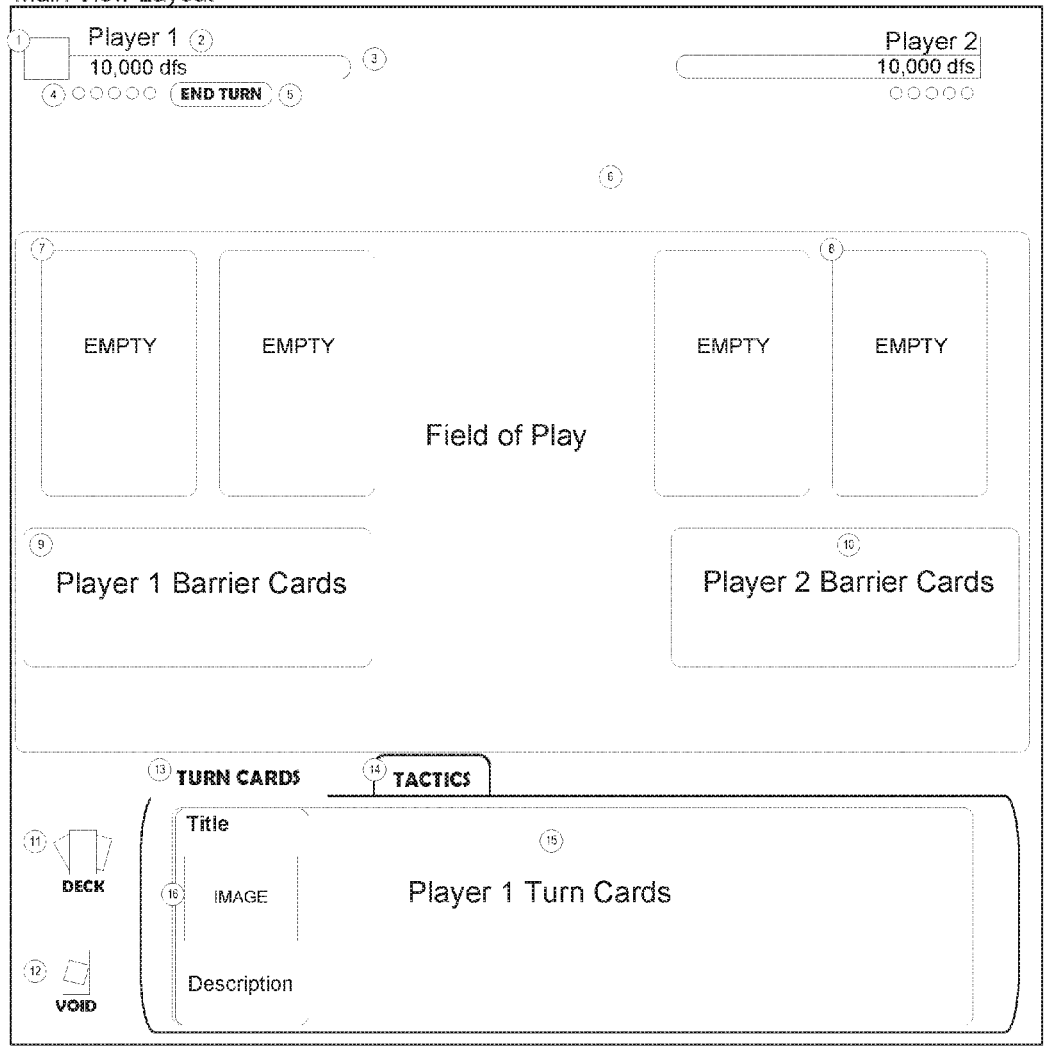
FIG. 25A shows a main view layout in a virtual embodiment of the card game.
Figure 25B:
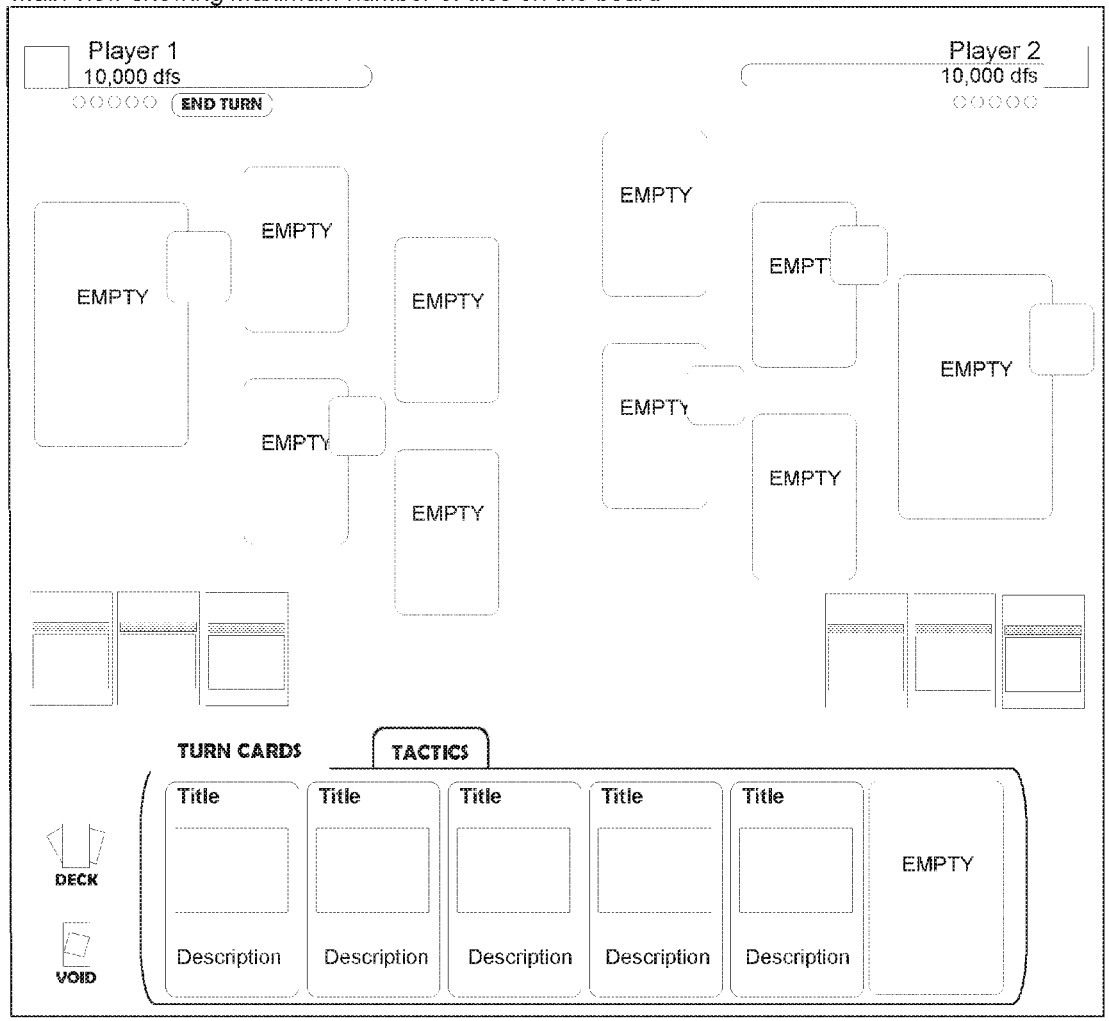
FIG. 25B shows the maximum number of tiles on the board in a virtual embodiment of the card game.
Figure 25C:
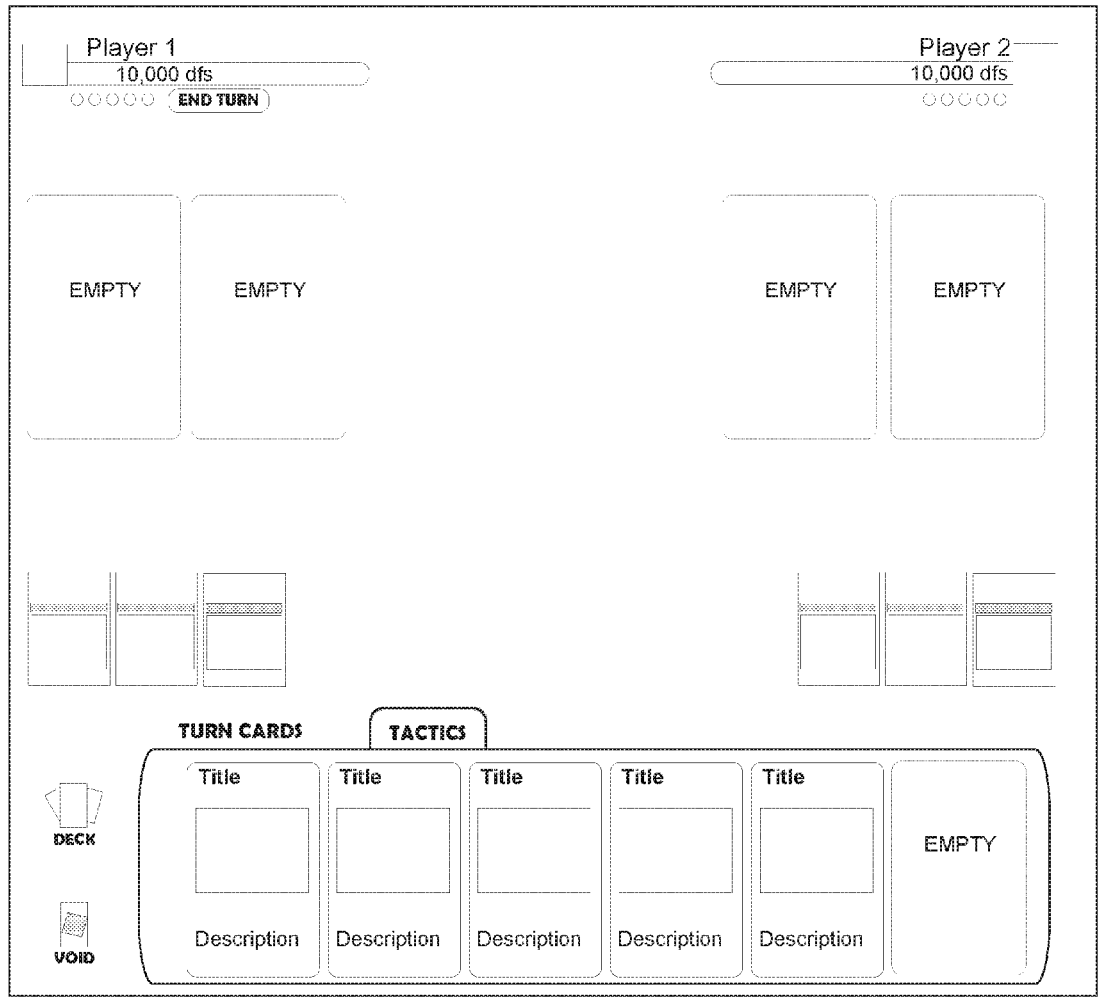
FIG. 25C shows the placement of initial tiles on the board in a virtual embodiment of the card game.
Figure 26A:
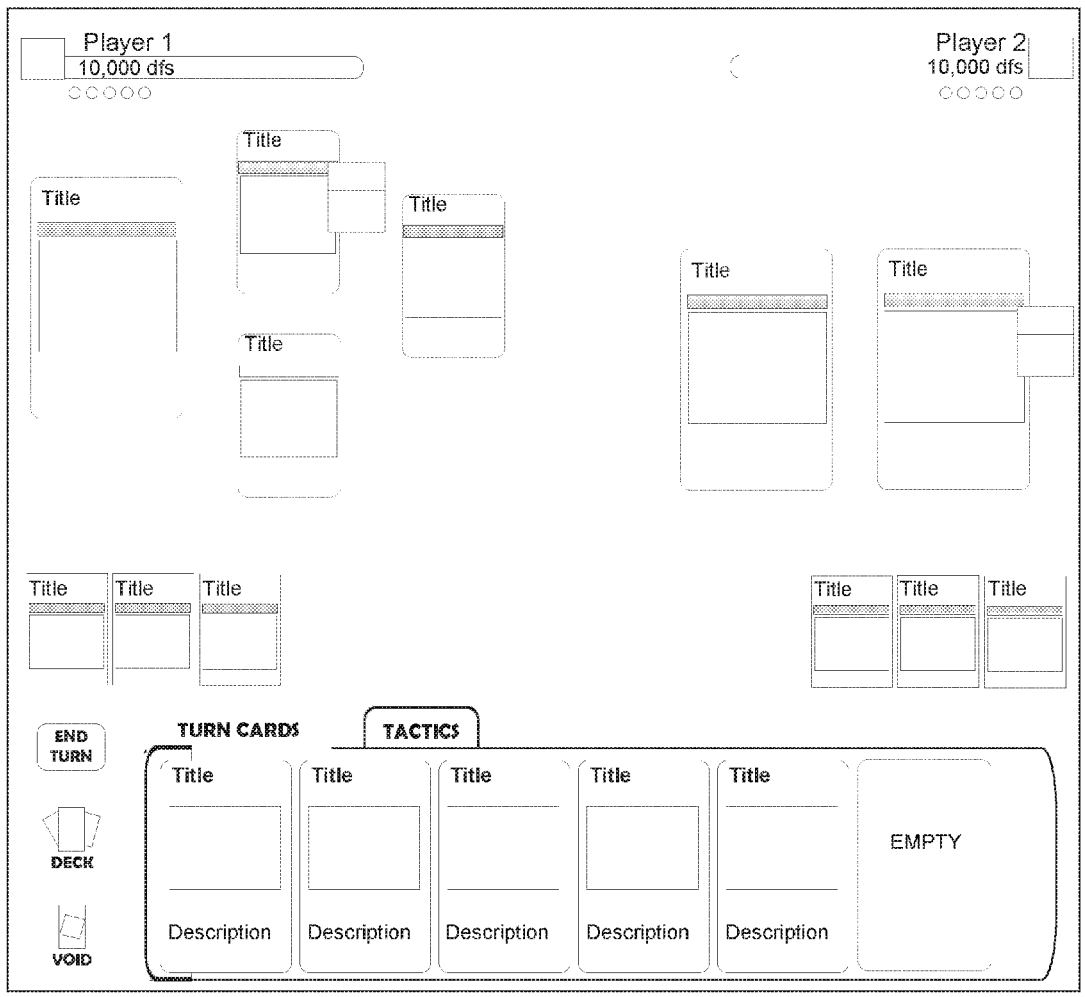
FIG. 26A shows a first step of stacking cards in a virtual embodiment.
Figure 26B:
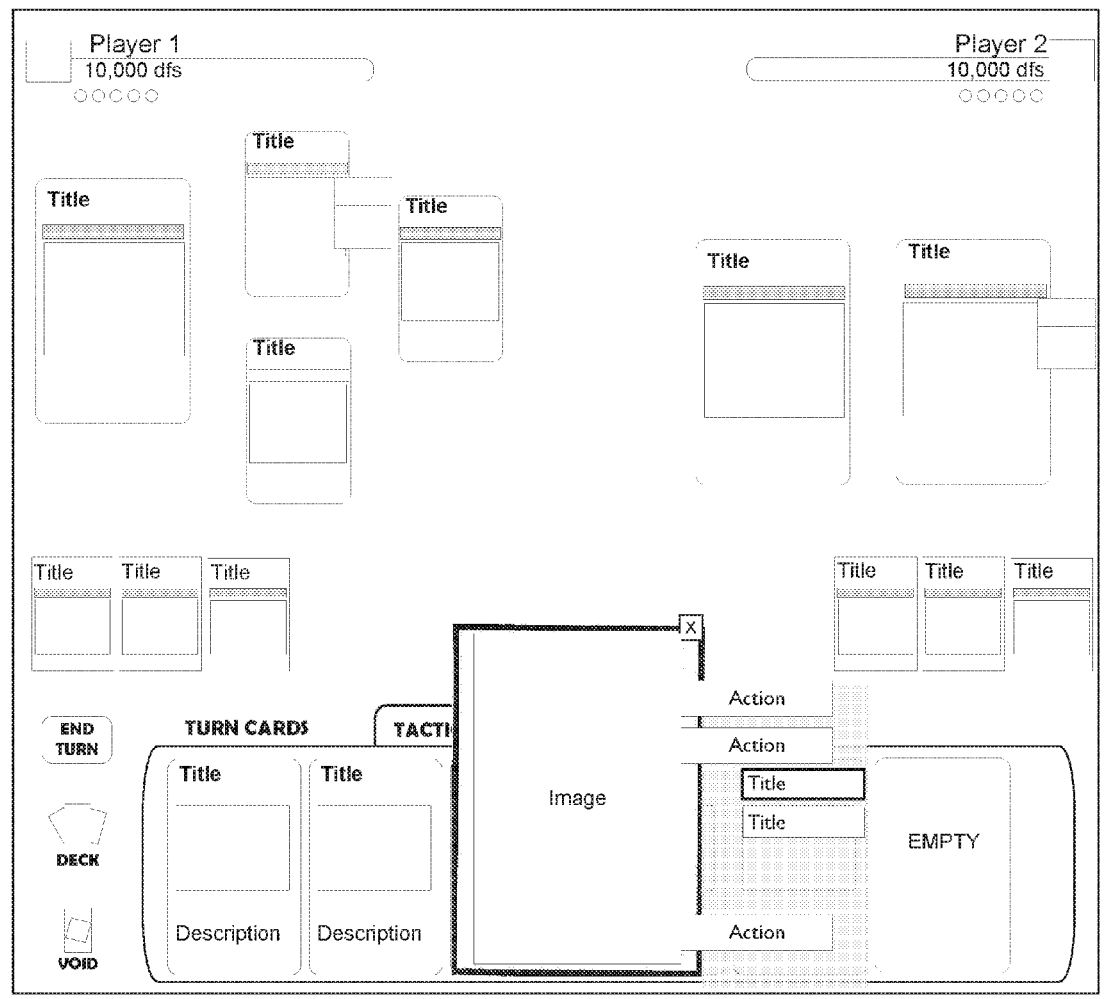
FIG. 26B shows a second step of stacking cards in a virtual embodiment.
Figure 26C:
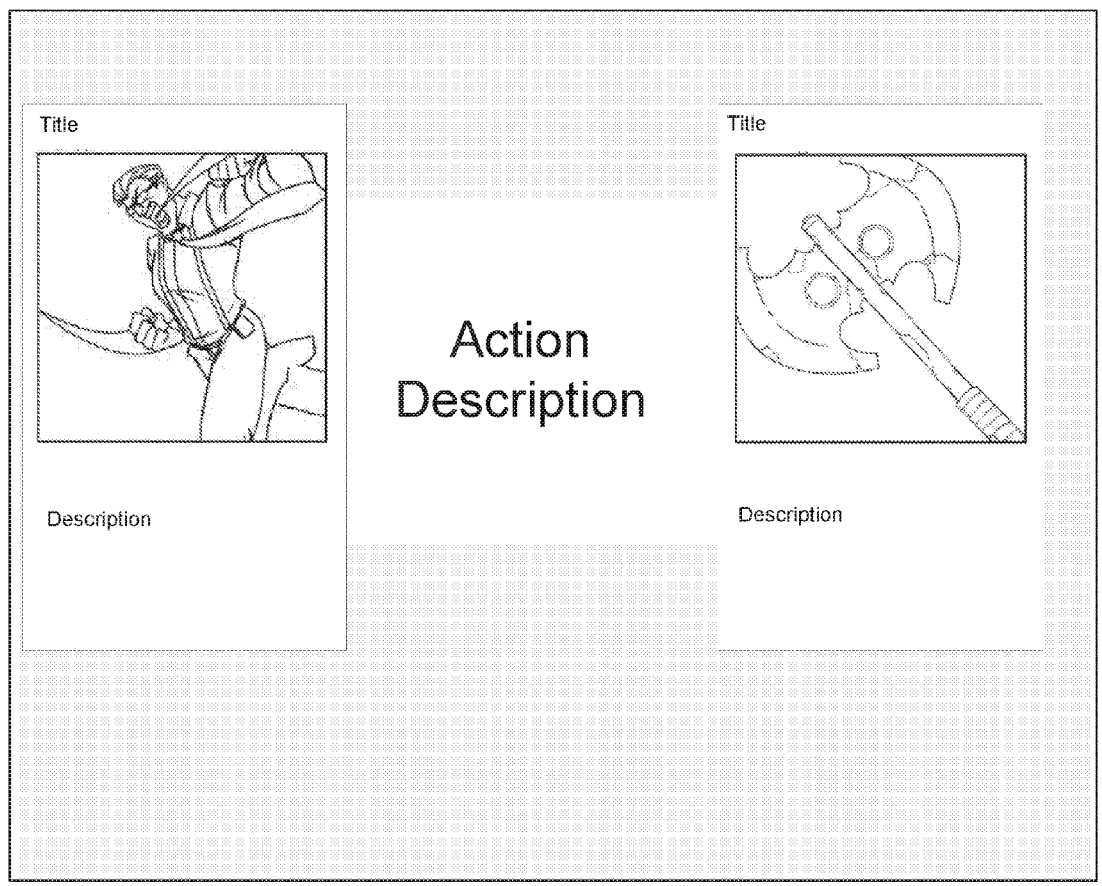
FIG. 26C shows a third step of stacking cards in a virtual embodiment.
Figure 26D:
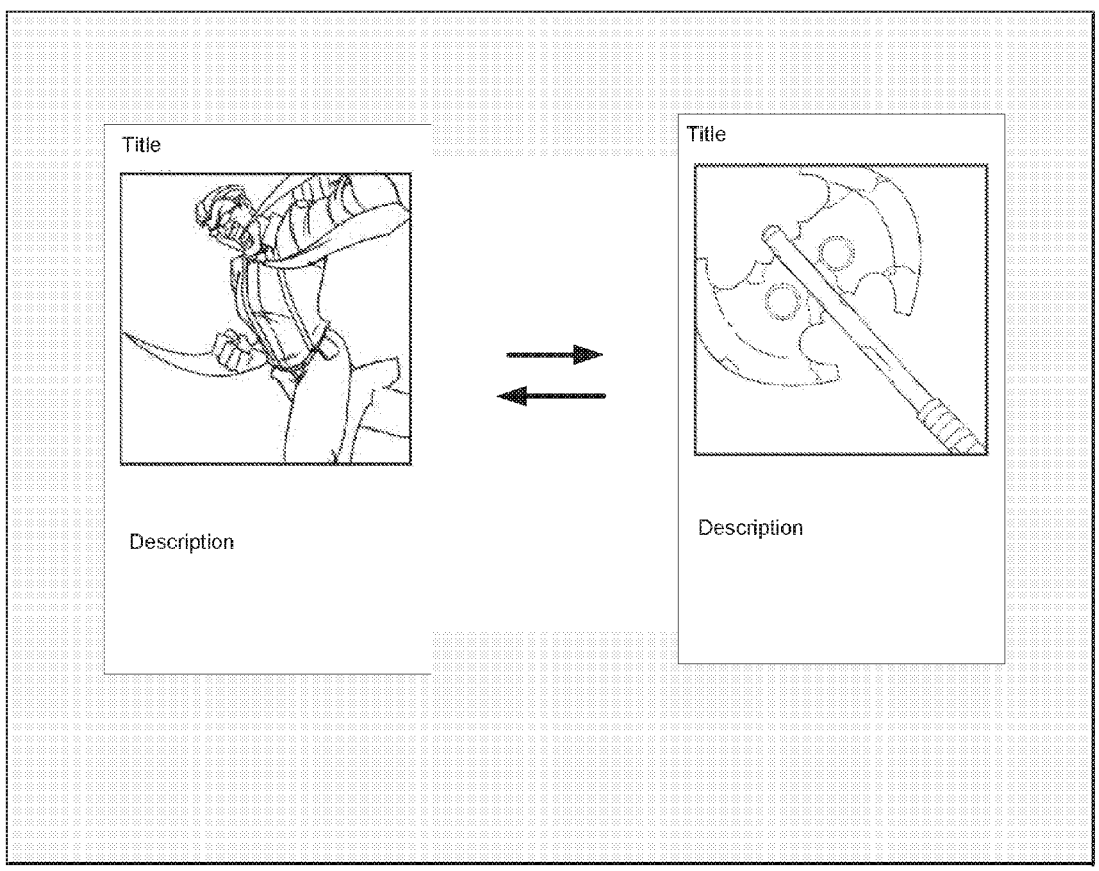
FIG. 26D shows a fourth step of stacking cards in a virtual embodiment.
Figure 26E:
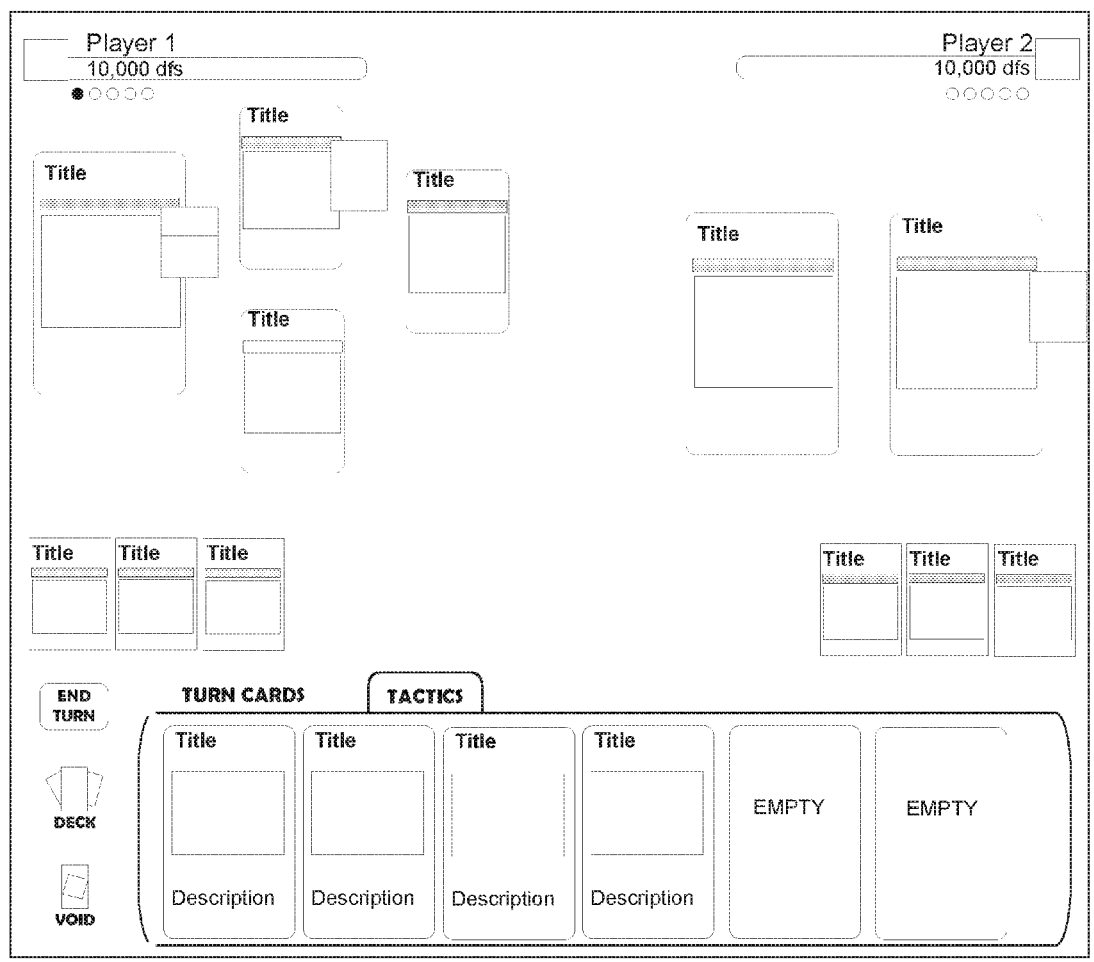
FIG. 26E shows the resulting stacked cards in a virtual embodiment.
Figure 27A:
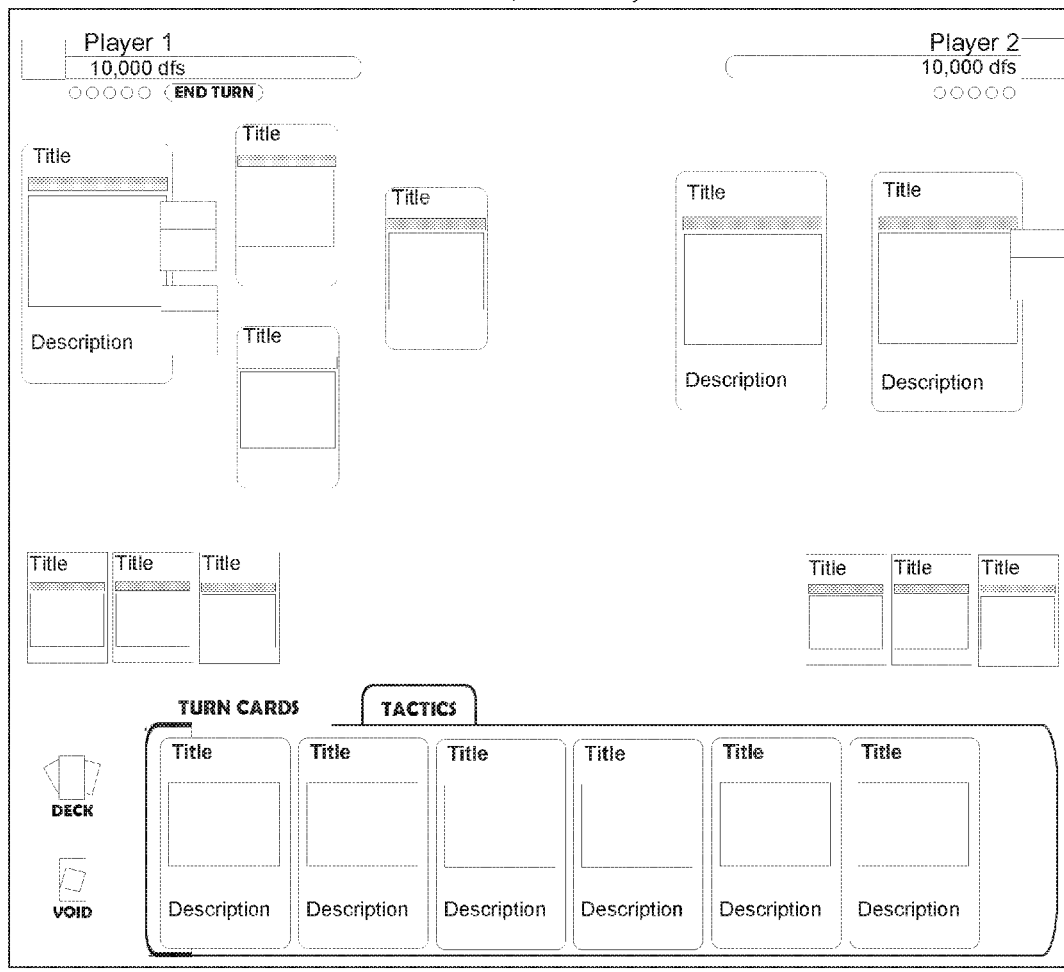
FIG. 27A shows a first step of attacking an opponent's army in a virtual embodiment.
Figure 27B:
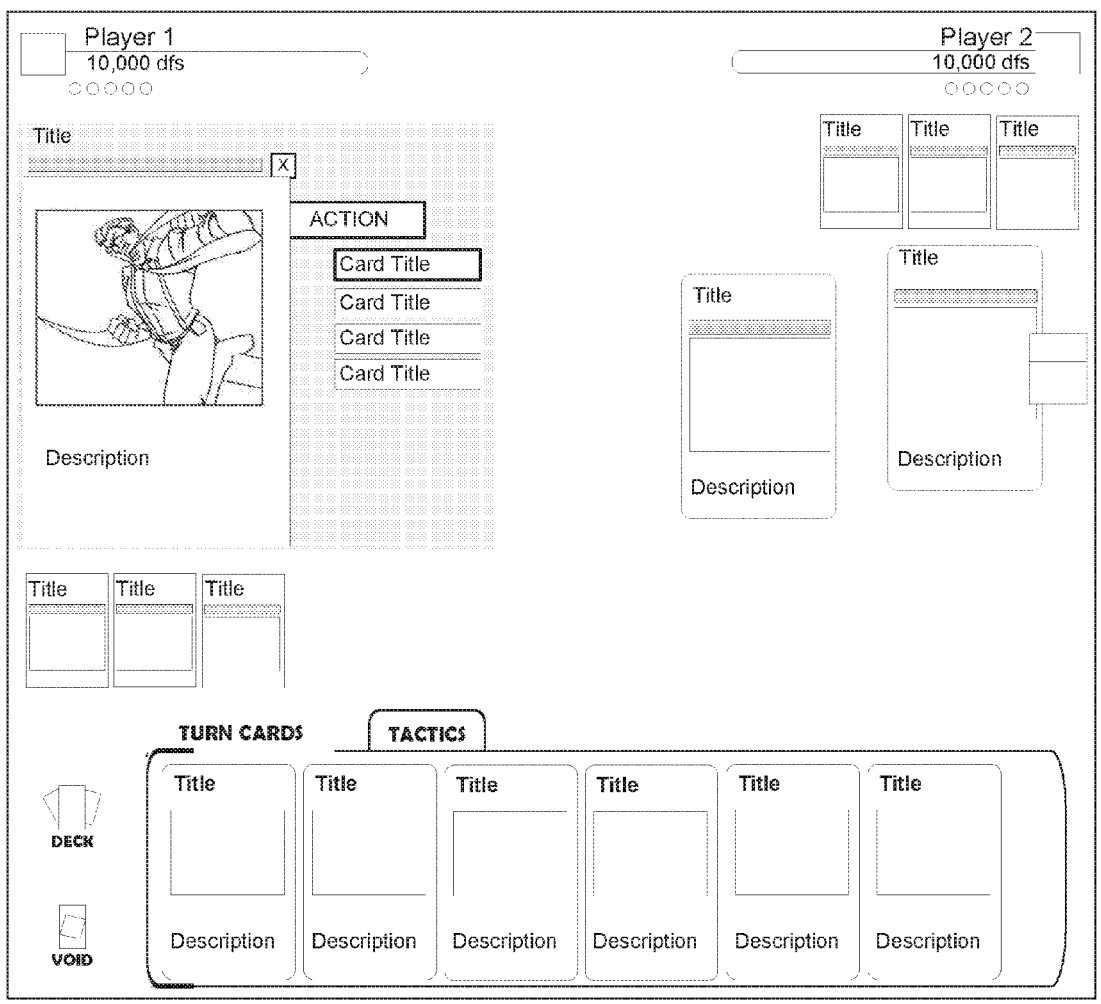
FIG. 27B shows a second step of attacking an opponent's army in a virtual embodiment.
Figure 27C:
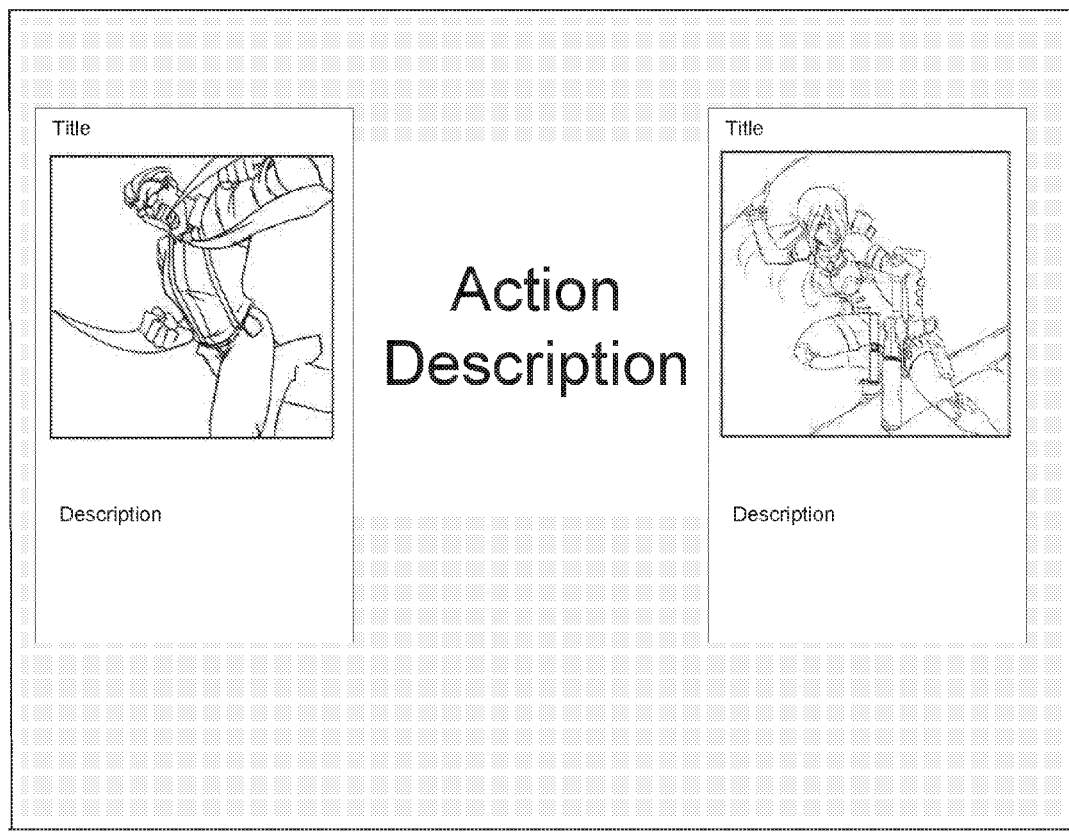
FIG. 27C shows a third step of attacking an opponent's army in a virtual embodiment.
Figure 27D:
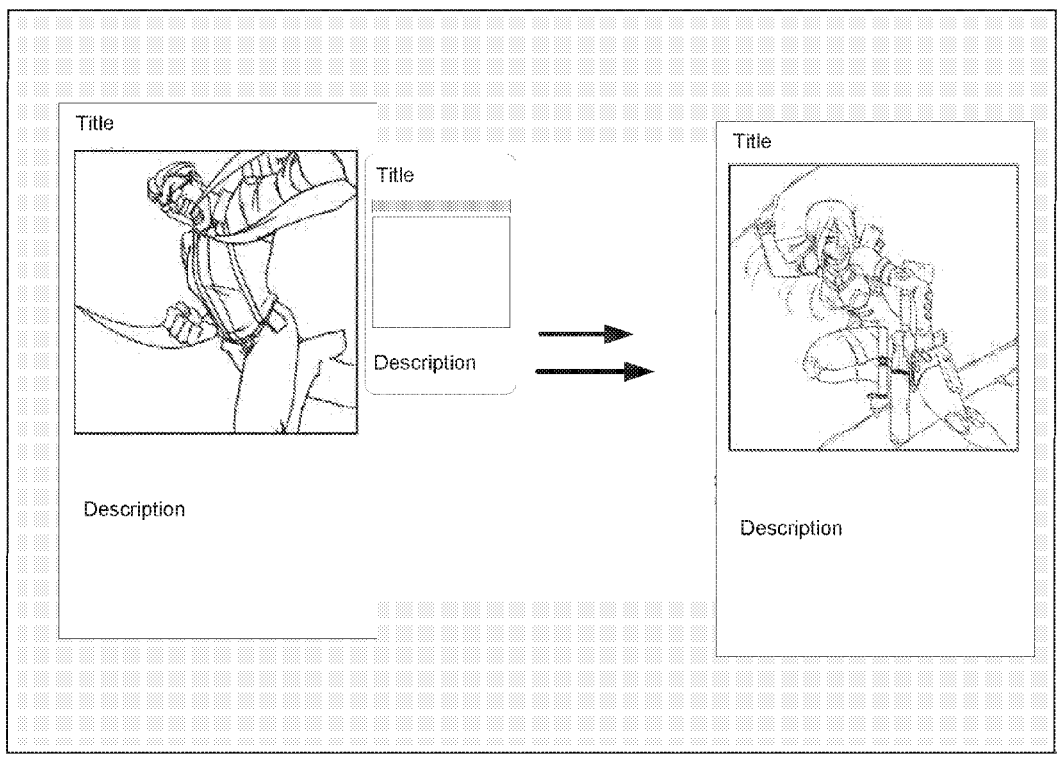
FIG. 27D shows a fourth step of attacking an opponent's army in a virtual embodiment.
Figure 27E:
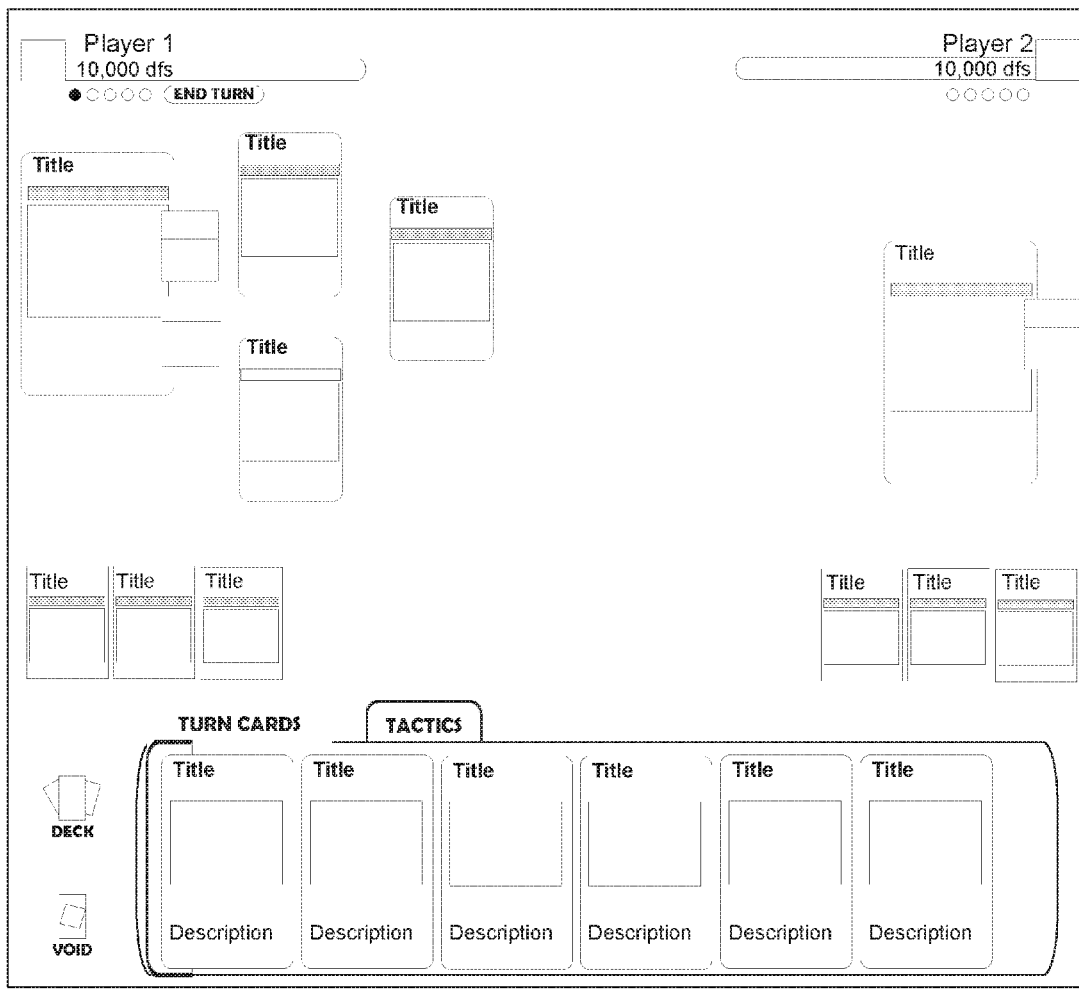
FIG. 27E shows an updated screen of the resulting attack in a virtual embodiment.

FIGS. 25A thru 25C illustrate, according to some embodiments, a virtual board for playing the card game. FIG. 25A shows the main board layout with the game's turn cards, field of play, and the barrier cards of player 1 and 2. FIG. 25B illustrates, in one embodiment, the maximum number of tiles during game play in a virtual embodiment. FIG. 25C shows the initial tile placement in a virtual embodiment.

FIGS. 26A thru 26E illustrate, according to an embodiment, a method of stacking cards in a virtual embodiment. First, the player selects a turn card from their hand. Once selected, the card displays with a full description and available actions for the card, wherein the player selects "stack." Next, the screen highlights the event and illustrates the resulting impact. Finally, the screen shows the stacked cards and a resulting empty spot in the turn card space.

FIGS. 27A thru 27E show, according to some embodiments, a method of attacking an opponent's cards. First, the player selects a card from their hand. Then, the card displays on the screen with a list of the available actions for the card, wherein the player selects "attack." After, the screen highlights and illustrates the resulting impact. Lastly, the screen shows the game's state as a result of the attack, and indicates the number of turns left for the player.

Figure 28A:
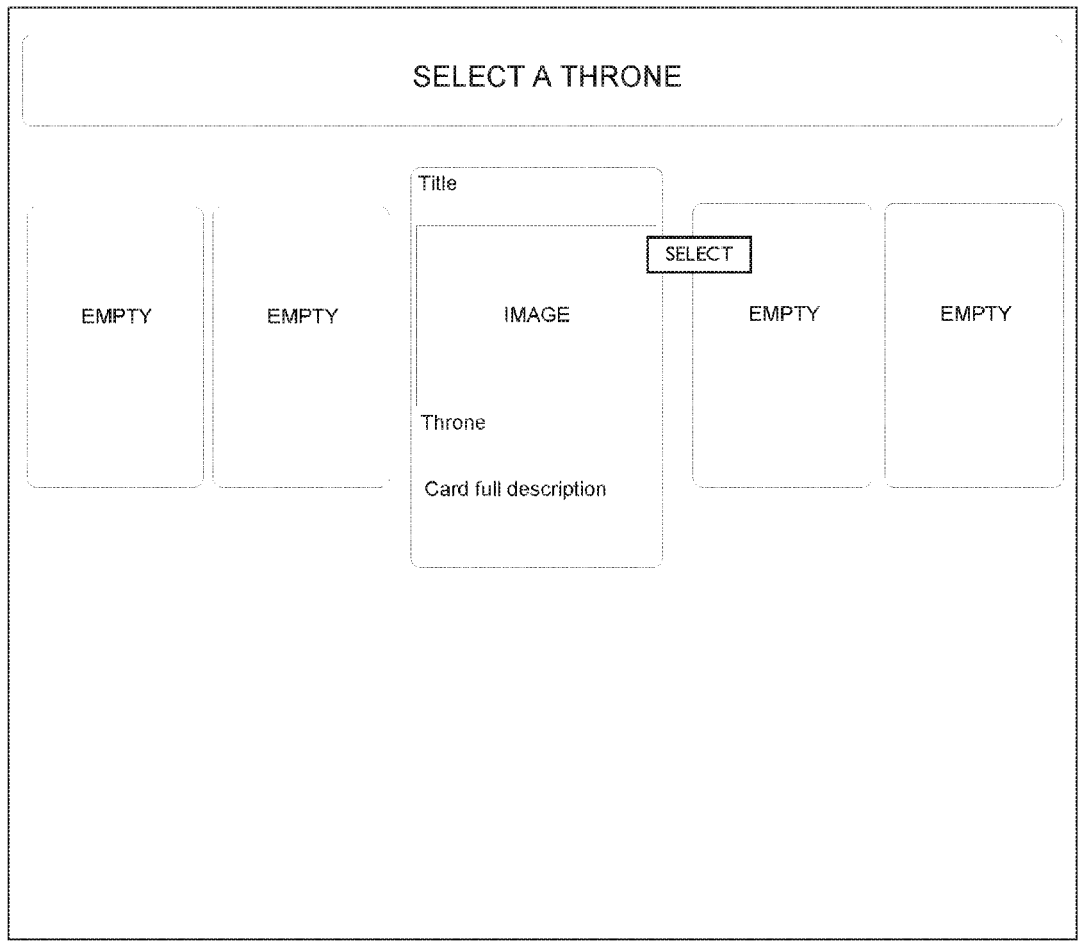
FIG. 28A shows a first step of setting up the card game in a virtual embodiment.
Figure 28B:
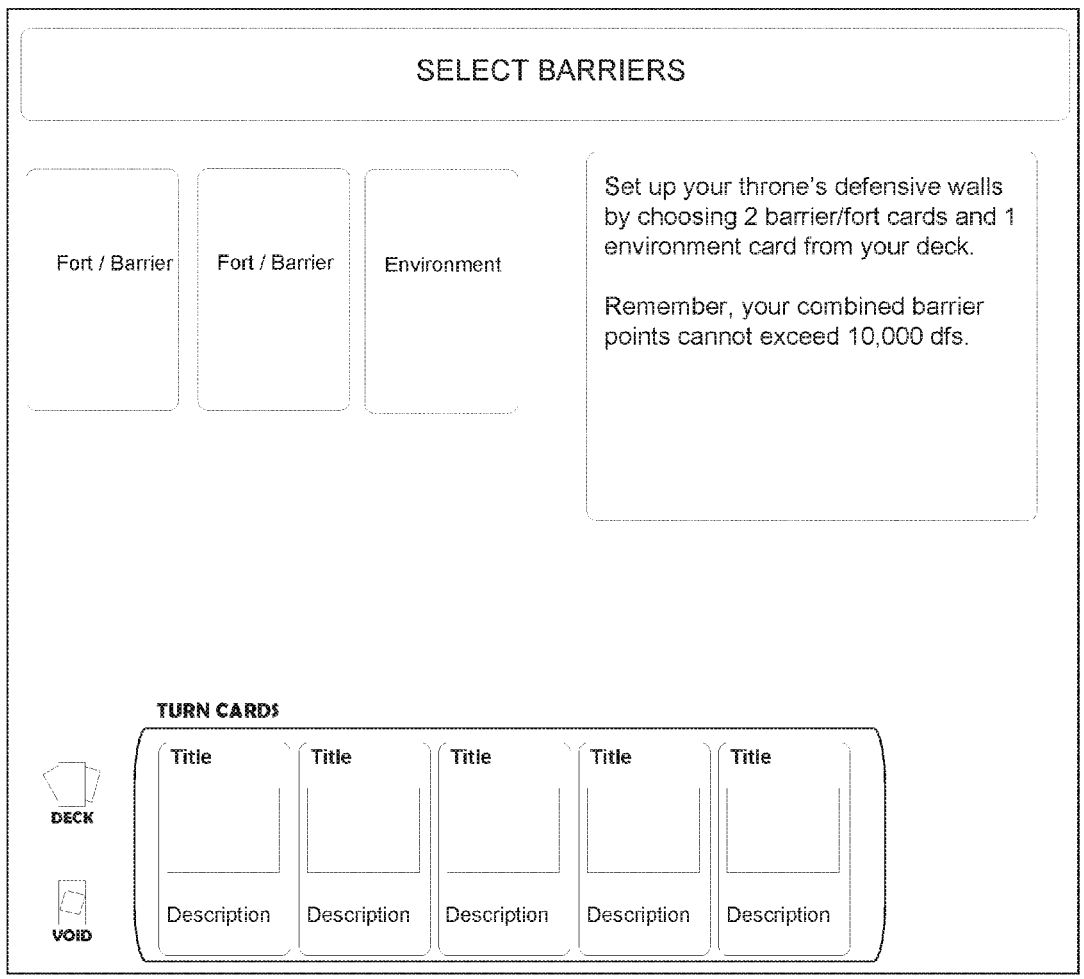
FIG. 28B shows a second step of setting up the card game in a virtual embodiment.
Figure 28C:
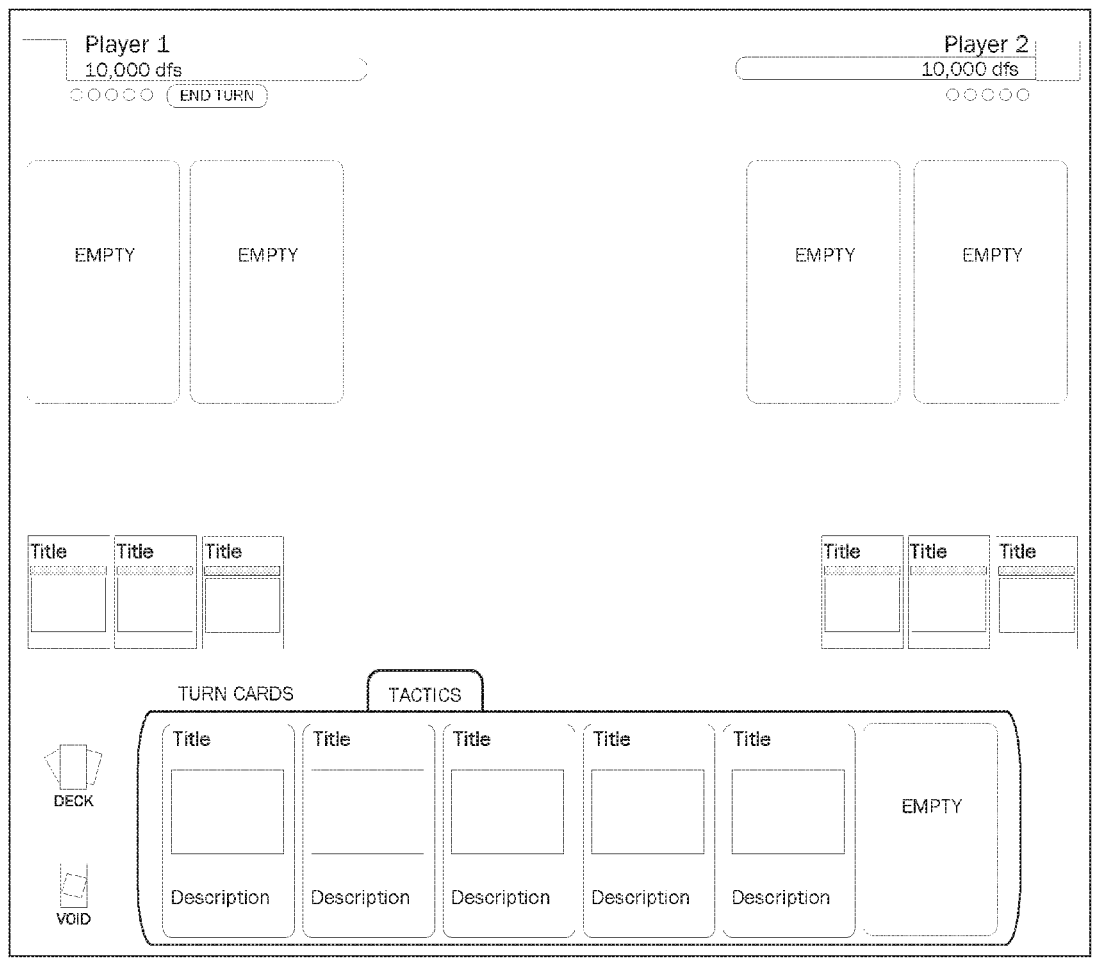
FIG. 28C shows a third step of setting up the card game in a virtual embodiment.

FIGS. 28A thru 28C shows, according to some embodiments, a method of setting up the card game in a virtual embodiment. The player selects the their throne card and next selects barrier cards. Once selected, the player enters their first turn.

Another feature of the present invention, according to some embodiments, is the limited availability of cards, of which are collectables. The limited availability of particular cards encourages players to trade for more powerful, rarer cards. In addition, players can complete a set of cards for both game playing and for collecting purposes. The method of play can be expanded to include a winner taking one or more of the loser's cards at the end of the game or tournament. However, many players are unwilling to utilize uncommon, unique or rare cards in this method of play. As such, an unlimited version, comprising of all card types, can be made available. In this sense, the current invention embodying unique game concepts and components can be modified within the spirit and the scope of the invention.

The terms and expressions that have been employed in this specification are used as terms of description rather than limitations, and are not intended to exclude equivalents of the features shown and described herein.

The invention claimed is:

1. A stacking and stockpiling trading card game, comprising:
   at least two throne cards, a plurality of structure cards, and a plurality of strategic cards, wherein: each throne card including a sovereign image and sovereign description text, and maintaining a passive state during the game unless at least one throne card is replaced by another card per predetermined rules of the game, each throne card having a defensive perimeter;
   the plurality of structure cards including at least one of a barrier card, an environment card and a fort card each having at least one of an attack point value, a defensive point value, and state altering components that when used create the defensive perimeter having a defensive perimeter total value of at least the sum of defensive point values on the at least one of: the barrier card, the environment card and the fort card;
   each fort card configured to protect the throne card, and including at least one of an image, a defense text describing an effect of a power, and an attack-defensive point characteristic, at least one of the fort cards capable of fortifying the defensive perimeter in response to a stacked army with at least 2500 defensive point value being sacrificed by subtracting the defensive point value from the sacrificed stacked army, adding the defensive point value of the fortifying fort to the defensive perimeter total value, and using 5 movements during one turn to sacrifice the stacked army;
   each of the plurality of strategic cards includes at least one of a strategic image, an attack point value, a defensive point value, an attack-defensive point value, and strategic instruction text, wherein the strategic instruction text includes state altering components to modify an effect of at least one of another strategic card or a structure card, and a number printed on a portion of the strategic card indicating a maximum number of a particular card type a player may keep in their deck for a specific time or round of play; and
   each environment card including, an environment image and environment instruction text, the environment instruction text includes at least one of a point determinative; and state altering component, each environment card configured to affect at least one of the plurality of strategic cards according to the environment instruction text by at least one of: increasing or decreasing a total attack point value of said at least one strategic card by adding or subtracting the attack point value of the at least one strategic card, increasing or decreasing a total defensive point value of said at least one strategic card by adding or subtracting the defensive point value of the at least one strategic card, and a modifying the rules of the game, the environment instruction text affecting said at least one strategic card before, during or after said at least one strategic card is utilized; and
   each of the plurality of strategic cards includes at least one of a strategic image, an attack point value, a defensive point value, an attack-defensive point value, and strategic instruction text, wherein the strategic instruction text includes state altering components to modify an effect of at least one of a strategic card or a structure card, and a number printed on a portion of the strategic card indicating a maximum number of a particular card type a player may keep in their deck for a specific time or round of play.

2. The stockpiling trading card of claim 1,
   wherein an army is built by combining in a sequence of no more than five strategic cards, the first card being a leader card, the second card being either an Army card, Lesser minion card or a secondary Leader card, and the third card being either the army card, the Lesser minion card or a tertiary Leader card,
   wherein the built army includes at least one of an attack point value of the first leader card and the second card which are added together with the other cards in the sequence to form the attack total value, and a defensive point value of the first leader card and the second card and the other cards in the sequence are added together to form the defensive total value, and
   wherein each of the plurality of strategic cards comprises an image and strategic instruction text wherein the instruction text includes state altering components to modify an effect of at least one of the strategic card or a structure card, for the leader card.

3. The card game of claim 1, wherein at least one of the structure cards for protecting each throne card comprises at least a Fort card point value and a barrier card point value, and wherein the plurality of strategic cards comprises at least one minion card including a minion attack-defense point value for attacking at least one of a structure card and a strategic card.

4. The card game of claim 1, further comprising each player setting into game play on the game surface at least one strategic card, at least one strategic card of a first player adjusts at least one of an attack value, a defensive value, or state altering component of the strategic card of a second player or modifies the rules of the game, wherein the at least one strategic card comprising at least one of: a blockade card, a corruption card, a purity card, a magic card, a boost card, a character card, a weapon card, a siege card, a treachery card, a terrain card, an environment card, an alliance card, and a tech card.

5. The card game of claim 1, wherein the plurality of strategic cards further comprising a plurality of character cards, the plurality of character cards capable of consolidating when a predetermined number of character cards are placed on a game surface, consolidated character cards of the at least one player capable of being used for at least one of attacking at least one of a barrier and a fort, destroying at least one of a barrier and a fort and capturing the throne card of any of the other plurality of players, when the sum of the attack point values of the consolidated character cards equal or exceeds a predetermined total attack point value.

6. The card game of claim 1, further comprising at least one player laying down additional structure cards on the game surface to create a 360 degree defensive perimeter around the throne card of the at least one player to increase the total defensive point value of the defensive perimeter that protects the throne card of the at least one player.

7. The card game of claim 1, wherein a Wall to Action is accomplished according to the text of at least one structure card and strategic card placed on the game surface by at least one player, an effect of an accomplished Wall to Action increasing or decreasing at least one of the number of movements required to complete an action by the first player and the number of movements required to complete an action by the second player.

8. The method of claim 7, wherein activating a tribute is accomplished by combining cards on the game surface that are in a passive state with cards that are in an active state at least one of the combined cards including text that modifies the effect of the Wall to Action.

9. The card game of claim 7, wherein each player increases the Wall to Action for the second player by forcing the second player to pay a penalty for going over a mandatory number of movements allowed per turn.

10. The card game of claim 1, wherein a siege card placed on the game surface is capable of lowering the Wall to Action according to the strategic text of the siege card.

11. The card game of claim 1, wherein at least one player is able to accomplish a movement of at least one of attacking and defending at least one of the barrier card and fort cards of the second player by utilizing one or more game components on the game surface that are in at least one of an active or passive game play state, the accomplished movement being accomplished according to at least one of rules of the game and text of the one or more utilized game components.

12. The card game of claim 1, wherein adding one or more game components to a fort card on the game surface increases at least one of the offensive and defensive characteristics of the fort card.

13. The card game of claim 1, wherein each player drawing at least one additional card determines which player can maintain the Wall to Action, wherein the loser concedes to attack by the other player or is unable to attack.

14. The card game of claim 1, wherein initiating a Quick Action Play is accomplished by using the plurality of cards of the initial playing hand, wherein Quick Action Play determines which player is at least one of able to attack or automatically destroy at least one of a fort card or barrier card of another player.

15. The card game of claim 1, wherein the first player to temporarily use the army of the second player or to disassemble the army of the second player on the game surface for the remaining duration of the game, wherein cards are in one of a passive or active state of play and are used to modify the rules of game play.

16. The card game of claim 1, wherein declaring a war and laying a siege on the defensive barriers of the second player is accomplished by selecting a predetermined number of cards from the first playing deck on the game surface, wherein a higher amount of combined attack points compared to combined defensive points of the second player wins the war.

17. The card game of claim 1, wherein battling a strongest card of the first player against a strongest card of the second player from the first playing deck of the second player, is accomplished the second player uses other cards from the first playing deck of the second player until the strongest card of the first player is defeated.

18. The card game of claim 1, wherein a particular type of card in the first playing deck of at least one of the first or second player is limited according to a number indicator on the card.

* * * * *